United States Patent
Betke et al.

(10) Patent No.: US 7,206,462 B1
(45) Date of Patent: Apr. 17, 2007

(54) METHOD AND SYSTEM FOR THE DETECTION, COMPARISON AND VOLUMETRIC QUANTIFICATION OF PULMONARY NODULES ON MEDICAL COMPUTED TOMOGRAPHY SCANS

(75) Inventors: Margrit Betke, Cambridge, MA (US); Jane P. Ko, New York, NY (US)

(73) Assignee: The General Hospital Corporation, Boston, MA (US)

(*) Notice: Subject to any disclaimer, the term of this patent is extended or adjusted under 35 U.S.C. 154(b) by 83 days.

(21) Appl. No.: 10/900,031

(22) Filed: Jul. 27, 2004

Related U.S. Application Data

(63) Continuation of application No. 09/812,021, filed on Mar. 19, 2001, now abandoned.

(60) Provisional application No. 60/189,978, filed on Mar. 17, 2000.

(51) Int. Cl.
*G06K 9/36* (2006.01)

(52) U.S. Cl. .................. 382/280; 382/131; 378/21

(58) Field of Classification Search ............ 382/100, 382/128, 129–134, 154, 168, 170, 172, 194, 382/203, 209, 237, 256, 266, 274, 305, 318, 382/280; 700/182; 600/424; 454/52; 710/120; 378/8, 21
See application file for complete search history.

(56) References Cited

U.S. PATENT DOCUMENTS

| | | | |
|---|---|---|---|
| 4,873,626 A * | 10/1989 | Gifford .................. 710/120 |
| 4,907,156 A | 3/1990 | Doi et al. |
| 5,133,020 A | 7/1992 | Giger et al. |
| 5,185,809 A * | 2/1993 | Kennedy et al. ............ 382/131 |
| 5,715,166 A * | 2/1998 | Besl et al. .................. 700/182 |
| 5,768,333 A | 6/1998 | Abdel-Mottaleb |
| 5,768,406 A | 6/1998 | Abdel-Mottaleb |
| 5,779,534 A * | 7/1998 | Kunec ........................ 454/52 |
| 5,807,256 A | 9/1998 | Taguchi et al. |
| 5,838,815 A | 11/1998 | Gur et al. |
| 5,881,124 A * | 3/1999 | Giger et al. .................. 378/8 |
| 5,974,165 A | 10/1999 | Giger et al. |
| 5,999,840 A * | 12/1999 | Grimson et al. ............ 600/424 |
| 6,363,163 B1 * | 3/2002 | Xu et al. .................... 382/130 |

OTHER PUBLICATIONS

Claudia I Henschke, et al., "Early Lung Cancer Action Project: overall design and findings from baseline screening", http://www.thelancet.com/newlancet/sub/issues/vol354no9173/body.article99, vol. 354, No. 9173, Jul. 10, 1999, pp. 1-13.

(Continued)

*Primary Examiner*—Jingge Wu
*Assistant Examiner*—Seyed Azarian
(74) *Attorney, Agent, or Firm*—Daly, Crowley, Mofford & Durkee, LLP

(57) ABSTRACT

A method and system for the automated detection and analysis of pulmonary nodules in computed tomographic scans which uses data from computed tomography (CT) scans taken at different times is described. The method and system includes processing CT lung images to identify structures in the images for one patient in each of a plurality of different studies and then relating the plurality of CT lung images taken from the patient in one CT study with a plurality of CT lung images taken from the same patient in at least one other different study to detect changes in structures within the CT images.

21 Claims, 21 Drawing Sheets

OTHER PUBLICATIONS

Claudia I. Henschke, PHD, MD, et al. "Neural Networks for the analysis of small pulmonary nodule", Clinical Imaging, Analysis of Small Pulmonary Nodules, Nov./Dec. 1997, vol. 21, No. 6, pp. 390-399.

Sarah H. Landis, MPH, et al. "Cancer Statistics, 1999" Aug. 12, 1999, CA Cancer J Clin., 49:8-31, pp. 1-6, 20 pgs.

Maryellen L. Giger, PHD. et al. "Computerized Detection of Pulmonary Nodules in Computed Tomography Images", Preliminary Report, Investigative Radiology, vol. 29, Apr. 1994, pp. 459-465.

K. Kanazawa, et al. "Computer-aided diagnosis for pulmonary nodules based on helical CT images", Computerized Medical Imaging and Graphics, 22, Feb. 17, 1998, pp. 157-167.

W.E.L. Grimson, et al. "An Automatic Registration Method of Frameless Stereotaxy, Image Guided Surgery, and Enhanced Reality Visualization", Transactions on Medical Imaging, 22, Feb. 1996 pp. 1-28.

Xin-Wei Xu, et al. "Development of an improved CAD scheme for automated detection of lung nodules in digital chest images", Med. Phys., vol. 24, No. 9, Sep. 1997, pp. 1395-1403.

Jeffrey N. Yu, et al. "Intermodality, Retrospective Image Registration in the Thorax", Journal of Nuclear Medicine, vol. 36, No. 12, Dec. 1995, pp. 2333-2338.

Stefan Eberl, et al. "Automated interstudy Image Registration Technique for SPECT and PET", J. Nucl. Med. vol. 37, No. 1, Jan. 1996, pp. 137-145.

Herber MacMahon, MD, et al. "Computer-aided Diagnosis of Pulmonary Nodules: Results of a Large-Scale Observer Test", Radiology, vol. 213, No. 3, Dec. 1999, pp. 723-726.

David F. Yankelevitz, MD. et al "Small Pulmonary Nodules: Volumetrically Determined Growth Rates Based on CT Evaluation", Radiology, vol. 217, No. 1, Oct. 2000, pp. 251-256.

Kazuto Ashizawa, et al. "Effect of an Artificial Neural Network on Radiologist' Performance in the Differential Diagnosis of Interstitial Lung Disease Using Chest Radiographs", Am J Roentgenol, vol. 172, May 1999, pp. 1311-1315.

Samuel G. Armato III, PHD, et al. "Computerized Detection of Pulmonary Nodules on CT Scans", Imaging & Therapeutic Technology, vol. 19, No. 5, Sep.-Oct. 1999, pp. 1303-1311.

Berthold Klaus, et al. "Robot Vision", MIT Press, Cambridge MA, 1986, pp. 1-3.

Charles A. Pelizzari, et al. "Accurate Three-Dimensional Registration of CT, PET, and/or MR Images of the Brain", Journal of Computer Assisted Tomography, vol. 13, No. 1 1989, pp. 20-26.

Matsumoto, et al. "Potential Usefulness of Computerized Nodule Detection in Screening Programs for Lung Cancer", Invest. Radiol., vol. 27, No. 6, Jun. 1992, pp. 471-475.

* cited by examiner

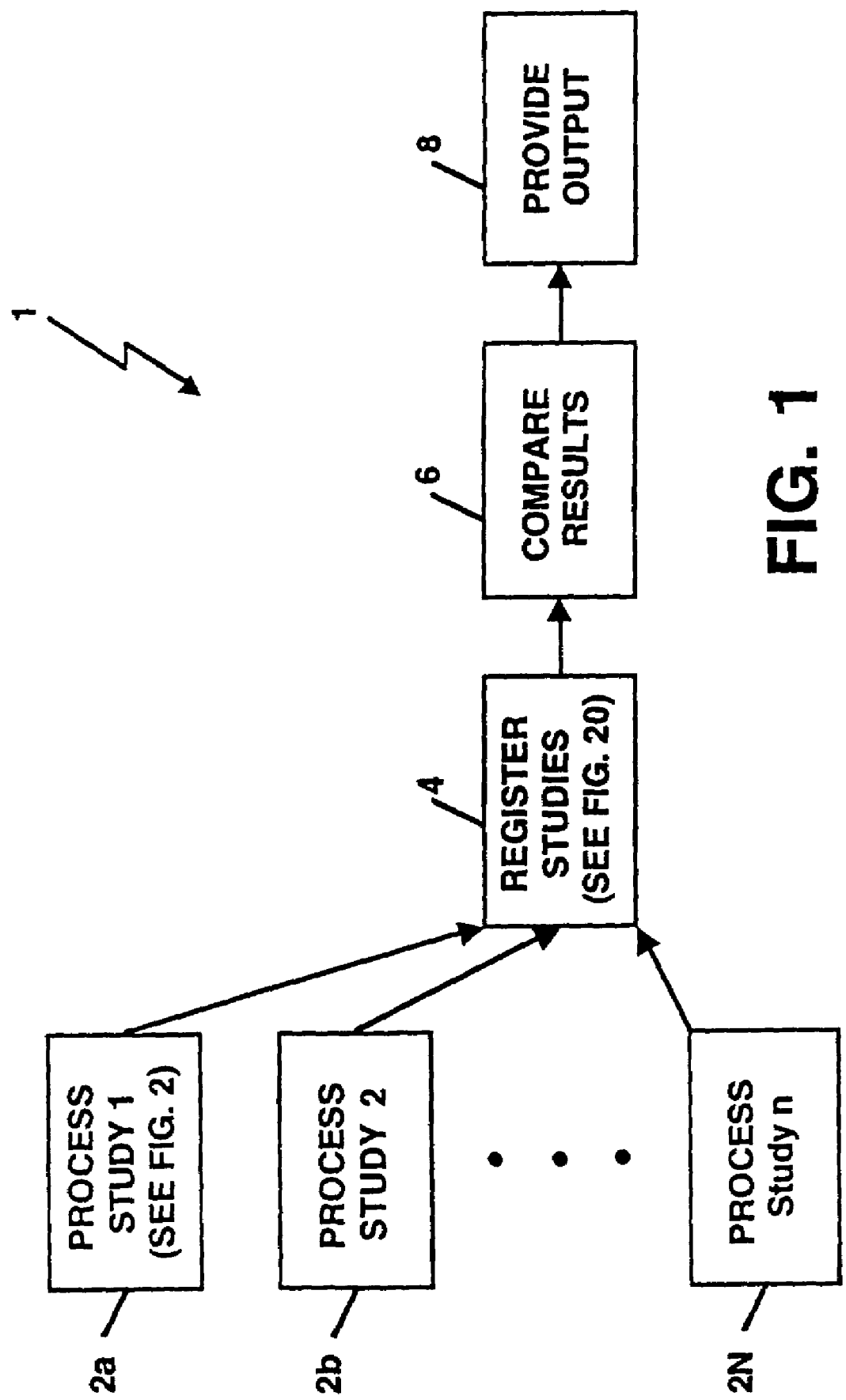

METHOD AND SYSTEM FOR THE DETECTION, COMPARISON AND VOLUMETRIC QUANTIFICATION OF PULMONARY NODULES ON MEDICAL COMPUTED TOMOGRAPHY SCANS

CROSS-REFERENCE TO RELATED APPLICATION

This application is a continuation of U.S. patent application Ser. No. 09/812,021 filed on Mar. 19, 2001 now abandoned, which claims the benefit of U.S. Provisional Application No. 60/189,978 filed Mar. 17, 2000, under 35 U.S.C. §119(e) both of which are hereby incorporated herein by reference in their entirety.

GOVERNMENT RIGHTS

Not Applicable.

FIELD OF THE INVENTION

This invention relates generally to a method and system for automated processing of medical computer tomographic data and more particularly to an automated method and system for automated detection of pulmonary nodules and for volumetric assessment and quantification of nodule change over time in computed tomography (CT) images of the thorax.

BACKGROUND OF THE INVENTION

As is known in the art, each year a relatively large number of new cancer cases are diagnosed. Every one in four deaths in the United States is from cancer. The National Cancer Institute estimates that a total of 8.2 million people in the United States have a history of cancer and are either cured or in the process of receiving therapy.

One type of cancer referred to as bronchogenic cancer initially manifests as a pulmonary nodule and is the leading cause of death from cancer. Additionally, the lung parenchyma is a frequent site for metastatic disease from extrathoracic malignancies and primary bronchogenic cancer. Breast, renal, thyroid, testicular, and sarcomatous tumors are common malignancies that spread to the lung. Most frequently spread is manifested as nodules, although spread can manifest as lymphadenopathy and lymphangitic patterns.

Numerous patients with a primary thoracic and extrathoracic malignancy undergo thoracic computed tomography (CT) scans to evaluate for metastasis and to evaluate for response of tumor to therapy. The manual detection, measurement of multiple pulmonary nodules, and assessment for change on sequential chest CTs can be time consuming and tedious. Currently, when a patient undergoes a thoracic CT, a radiologist first detects whether there are nodules present. Then the radiologist identifies the nodule on the image it appears the largest. The largest dimension in this plane is then measured, and the distance at an orthogonal projection is then measured. If there is a previous study, the dimensions of the nodule, if present, is measured similarly and the measurements on the two studies compared. A change in shape or volume of the nodule is noted. All these steps allow for observer error, inter-observer variation and other human sources of error. Also, prior art techniques have been developed to manually register 18-fluorodeoxyglucose PET scans of the chest with CT scans of the chest. Since such techniques are manual, however, they are time consuming and prone to human error.

Studies have demonstrated that computer-aided diagnosis systems improve a radiologist's performance (e.g. receiver operator characteristics) for detection of pulmonary nodules and interstitial lung disease on chest radiographs. Prior art systems have primarily addressed automated nodule detection on CT scans and chest radiographs.

Prior art techniques for registering CT images between scans have been investigated primarily for the brain and involving registration of positron emission tomography (PET) images with MRI or CT. Automated registration of redistribution and reinjection studies of thallium-201 cardiac single photon emission computed tomography studies have been performed in phantoms and patients. Some studies have investigated comparing sequential images within the same CT study. Still other studies describe the registration of different three-dimensional data sets of the brain to transfer preoperative surgical plans to the operating room.

There is, however, a need to better quantify the extent of pulmonary nodules and their change over time. It would thus be further desirable to provide a system that quantitates the extent of pulmonary nodules and their change over time. Furthermore, none of these prior art registration approaches, however, have compared two different CT studies of the chest to automatically assess change in nodule volume.

It would also be desirable to provide a system which automatically detects both cancerous and non-cancerous nodules from a first set of CT images taken in a single study, and which also compares the nodules detected in the first set of CT images with nodules found in one or more additional sets of CT images taken in sequential studies. It would also be desirable to automatically classify the nodules detected in the sets of CT images. It would also be desirable to provide a computer diagnosis system that automatically detects nodules, quantitates their volume, and assesses their change over time in sequential CT scans. It would be further desirable to provide a system that can automatically detect nodules in low-dose CT screening for lung cancer in higher risk patients to decrease interpretation time and false negatives in a screening scenario. It would also be desirable to provide a technique which increases the accuracy of examinations and diagnosis using CT scans. It would be further desirable to provide a system and technique which reduces the number of images an examiner (e.g. a doctor) must examine to determine if a nodule exists in a patient lung. It would be further desirable to provide a technique for automatic detection of nodules in a lung.

SUMMARY OF THE INVENTION

In view of the foregoing problems and limitations of the prior art, the following objects are met by the present invention.

An object of this invention is to provide a method and system for automatically analyzing computed tomography (CT) data between two different CT studies to identify normal and abnormal structures and to display these results on images.

Another object of this invention is to provide an automated method and system for assessing and quantifying volumetric changes of abnormal structures in CT images that occur over time, including but not limited to CT images of the chest.

Another object of this invention is to provide an automated method and system for detecting and displaying normal and abnormal structures in thoracic CT images.

Another object of this invention is to provide an automated method and system for detecting the thoracic boundaries on CT scan images and displaying them.

Another object of this invention is to provide an automated method and system for identifying the trachea in CT images of the chest and displaying it.

Another object of this invention is to provide an automated method and system for identifying the spine in CT images of the chest and displaying it.

Another object of this invention is to provide an automated method and system for identifying the sternum in CT images of the chest and displaying it.

Another object of this invention is to provide an automated method and system for identifying the diaphragm in CT images of the chest and displaying it.

Another object of this invention is to provide an automated method and system for identifying the carina in CT images of the chest and displaying it.

Another object of this invention is provide an automated method and system for detecting the boundaries of the lung and displaying them on a CT scan image.

Another object is provide an automated method and system for analyzing the computed lung border curvature and correcting it so that structures within the lung are not excluded from the lung, and for displaying the corrected lung border on a CT scan image.

Another object of this invention is to provide an automated method and system for identifying vessels and normal structures of the lung and abnormal structures of the lung and displaying these as candidate regions.

Another object of this invention is provide an automated method and system for characterizing candidate regions as either normal structures such as vessels and bronchi or abnormal structures such as nodules.

Another object of this invention is to provide an automated method and system that uses registration techniques to compare images on sequential CT images within one study and register nodules on sequential slices.

Another object of this invention is to provide an automated method and system for automated quantification of the volumes of the nodules identified on a CT image. This is accomplished by identifying the image on which it is most bright, calculating the number of pixels the nodule contains, and translating pixel number into diameter and subsequently volume measurements.

Another object of this invention is to provide an automated method and system for registering anatomical structures and nodules on a CT image with corresponding images on a subsequent patient CT study.

These and other objects are achieved according to the invention by supplying an automated system and techniques which improve on lung border detection, candidate region identification and classification, and comparison of images within the same thoracic CT study and by providing a method and system that can automatically register images between two separate studies, and which can quantify nodule size, and assess for change in nodule size over time, in sequential CT studies.

The system technique includes processing CT lung images to identify structures in the images for one patient in each of a plurality of different studies and then relating the plurality of CT lung images taken from the patient in one CT study with a plurality of CT lung images taken from the same patient in at least one other different study to detect changes in structures within the CT images. The original CT data in each CT image in each study is processed by square-root processing and data reduction via downsampling and multi-level thresholding, respectively. The image data is analyzed to automatically identify anatomical regions, such as thorax and lungs, and anatomical landmarks such as trachea, sternum, spine, carina, aortic arch, diaphragm, and lung parenchymal vessels and nodules. Identification of the thorax involves analysis of projection histograms. Identification of the lungs involves tracing boundaries for the pleural interfaces, curvature analysis, and boundary correction. The anatomical landmarks are identified by matching generic landmark templates with the image data. Nodules are detected and distinguished from vessels using predetermined criteria for size, location and shape. All of the images within one study on which a nodule is visualized are identified and the nodule volume is automatically computed. The generated images for a CT study are then matched with corresponding images in a follow-up study by registering anatomical landmarks. This can be accomplished via affine transformations for example. Corresponding nodules are identified, their volumes are compared, and volumetric changes are computed and available to a user.

In accordance with the present invention, a technique for the automatic detection of nodules within computed tomographic (CT) images of a lung includes processing a plurality of CT lung images, each of the images comprised of lung image data, taken from a patient in one CT study and relating the plurality of CT lung images taken from the patient in one CT study with a plurality of CT lung images taken from the same patient in another study. With this particular arrangement, a technique for automatically detecting nodules, quantitating their volume, and assessing for their change over time in sequential CT scans is provided. Such a technique is important for patient care and clinical productivity. In terms of patient care, such a system can be applied to two clinical scenarios in particular: 1) to quantitate tumor load and any change with treatment in oncology patients and 2) to screen high-risk populations for pulmonary nodules and lung cancer. With respect to clinical productivity, since the technique of the present invention can quantitate the number and volume of nodules and then calculate the overall tumor load in the lung parenchyma, the technique relieves the doctor from performing this task manually (i.e. by physically examining multiple CT images which is a very time consuming process subject to human error). Thus, the technique of the present invention can have significant impact on the treatment of oncology patients undergoing standard and experimental protocol treatments.

In accordance with a further aspect of the present invention, a system for automatically detecting nodules within computed tomographic (CT) images of a lung includes a CT image processor for processing a plurality of CT lung images, each of the CT lung images comprised of lung image data, taken from a patient in one CT study and a relationship processor for relating the plurality of CT lung images taken from the patient in one CT study with a plurality of CT lung images taken from the same patient in another study. With this particular arrangement, a computer diagnosis system that automatically detects nodules, quantitates their volume, and assesses for their change over time in sequential CT scans is provided. Such a system can be used to rapidly and accurately quantitate tumor load and any change with treatment in oncology patients. The system can also be used to screen high-risk populations for pulmonary nodules and lung cancer. Moreover, since the system of the present invention allows the doctor to spend less time reviewing images from CT scans and reduces human error involved in reviewing multiple images generated from the CT scans.

In prior art approaches, oncologists enter quantitative data for treatment protocols and make treatment decisions based on changes seen in images generated using from CT scans. Since the system of the present invention can quantitate the number and volume of nodules and then calculate the overall tumor load in the lung parenchyma, the system can have significant impact on the treatment of oncology patients undergoing standard and experimental protocol treatments.

Preliminary data also suggest that the present invention may also be useful in low-dose CT screening. In this application, the system automatically detects nodules is used to examine images generated from low-dose CT screening for lung cancer in higher risk patients to decrease interpretation time and false negatives in a screening scenario. The Early Lung Cancer Action Project demonstrated that low-dose CT detected nodules in 23% and malignancy in 2.7% of volunteers with a smoking history as compared to chest film, which detected nodules in 7% and malignancy in 0.7%. The identification of lung cancer at an early stage is crucial for the improved survival, as the overall 5-year survival rate for lung cancer is now 15%. The 5-year survival rate approaches 70% when Stage I lung cancer is detected and resected early.

It has been recognized that while some automation of detection of nodules has been done, automated assessment of change in nodule number and size on CT images, in sequential studies, has not been performed previously. Work has primarily addressed automated nodule detection on CT scans and chest radiographs. Studies have demonstrated that computer-aided diagnosis systems improve a radiologist's ROC curves for detection of pulmonary nodules and interstitial lung disease on chest radiographs. However, there is a need to better quantify the extent of pulmonary nodules and their change over time. Such a need is met by automatic identification of nodules between multiple studies and correlation of the nodules to observe changes in the nodule size.

With the early repeat CT techniques of the present invention, it may be possible to detect growth in relatively small malignant tumors including tumors having diameters in the range of five millimeters (mm) and less.

By comparing two different CT studies of the chest, it is possible to automatically assess change in nodule volume. Conventionally, such comparisons are made by first visually examining the images to identify nodules. If a nodule is identified, then a visual assessment it made if it was present on a prior study to assess for change. If the nodule was present previously, electronic calipers can be used to measure the nodule on both studies to assess for changes in size. Although electronic calipers are used, the points which define the nodule are manually selected. This manual approach can yield inconsistent results in nodule measurements, which makes it difficult to accurately assess response to treatment. The present approach provides more consistent results due to use of multiple studies and registration techniques.

BRIEF DESCRIPTION OF THE DRAWINGS

The foregoing features of the invention, as well as the invention itself may be more fully understood from the following detailed description of the drawings, in which:

FIG. 1 is a flow diagram illustrating the automated method of comparing different CT studies and tabulating nodule growth;

DESCRIPTION OF THE PREFERRED EMBODIMENTS

Figure 1A:
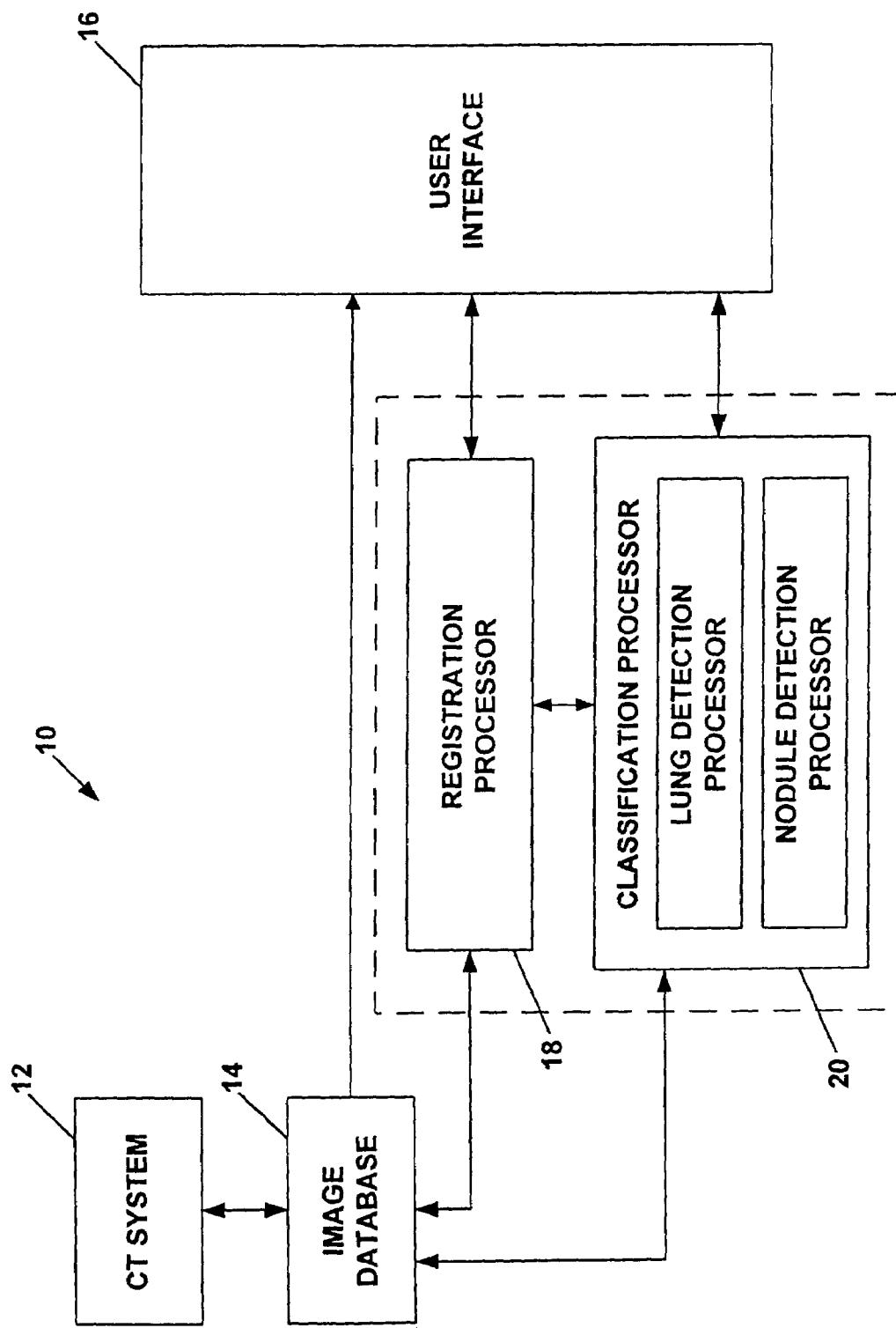
FIG. 1A is a block diagram of a system for the detection, comparison and volumetric quantification of pulmonary nodules on medical computed tomography scans.

Before describing a system for the detection, comparison and volumetric quantification of pulmonary nodules on medical computed tomography scans and the techniques required to performed such operations some introductory concepts and terminology are explained.

A computed tomography (CT) system generates signals which can be stored as a matrix or array of digital values in a storage device of a computer or other digital processing device. Each of the numbers in the array correspond to a digital word (e.g. an eight-bit binary value) typically referred to as a "picture element" or a "pixel" or as "image data." The array of digital values can be combined to display an image. Conversely, an image may be divided into a two dimensional array of pixels with each of the pixels represented by a digital word. Thus, a pixel represents a single sample which is located at specific spatial coordinates in the image.

The signals generated by the CT system are used to provide so-called CT images. As described herein, the CT image is divided into a two-dimensional array of pixels, each represented by a digital word. The value of each digital word corresponds to the intensity of the image at that pixel. The gray value (i.e. the numerical value of a pixel) is a density average that describes the volume slice within the thickness imaged. Thus, soft tissue structures in the lung that fill the entire slice appears brighter than structures that are smaller than the slice thickness because the latter are average with the surrounding lung parenchyma. One of ordinary skill in the art will recognize that the techniques described herein are applicable to various sizes and shapes of pixel arrays. One of ordinary skill in the art will also recognize that multiple two-dimensional array of pixels can be combined to form a three-dimensional array of pixels. Techniques for displaying images represented in such a fashion, as well as techniques for passing such images from one processor to another, are known.

Thus, soft tissue structures in the lung that fill the entire slice appears brighter than structures that are smaller than the slice thickness because the latter are average with the surrounding lung parenchyma.

Reference is also sometimes made herein to an image as a two-dimensional pixel array. An example of an array size is size 512×512. One of ordinary skill in the art will of course recognize that the techniques described herein are applicable to various sizes and shapes of pixel arrays including irregularly shaped pixel arrays.

An "image region" or more simply a "region" is a portion of an image. For example, if an image is provided as a 32×32 pixel array, a region may correspond to a 4×4 portion of the 32×32 pixel array.

In many instances, groups of pixels in an image are selected for simultaneous consideration. One such selection technique is called a "map" or a "local window" or a "mask." For example, if a 3×3 subarray of pixels is to be considered, that group is said to be in a 3×3 local window. One of ordinary skill in the art will of course recognize that the techniques described herein are applicable to various sizes and shapes of local windows including irregularly shaped windows.

It is often necessary to process every such group of pixels which can be formed from an image. In those instances, the local window is thought of as "sliding" across the image because the local window is placed above one pixel, then moves and is placed above another pixel, and then another, and so on. Sometime the "sliding" is made in a raster pattern. It should be noted, though, that other patterns can also be used.

Reference is also sometimes made herein to processing steps which takes place on data represented by a certain number of bits (e.g. 8 bits, 12 bits, 16 bits, 32 bits, etc. . . . ). Those of ordinary skill in the art will appreciate of course that, unless otherwise stated, the processes described herein can be applied to data represented as any number of bits. Sometimes, the number of bits used to represent data in certain processing steps is selected to facilitate processing speed.

FIGS. 13–17, 19A–19D and 22A–22D below are a series of images illustrating one or more lung nodules found after processing CT images via the technique of FIG. 1. It should be noted that the lung nodule processor receives CT images of the lungs and processes the CT images to detect the lung nodules. FIGS. 13–17, 19A–19D and 22A–22D show the operations as performed on a two-dimensional image and a series of such two-dimensional images (each of which has been processed) can be combined to provide a three-dimensional image of the lung or a lung section. Such two-dimensional and three-dimensional images can then be processed further processed to detect nodules or other irregular structures in the anatomy of the lung.

FIGS. 1, 2, 3A–3B, 4, 18 and 20 are a series of flow diagrams showing the processing performed by a processing apparatus which may, for example, be provided as part of a lung nodule detection system 10 (FIG. 1) to perform automated detection, comparison and volumetric quantification of pulmonary nodules on medical computed tomography scans. The rectangular elements (typified by element 2 in FIG. 1), are herein denoted "processing blocks," and represent computer software instructions or groups of instructions. The diamond shaped elements (typified by element 24 in FIG. 2), are herein denoted "decision blocks" and represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Turning now to FIG. 1, the steps in automated detection, comparison and volumetric quantification of pulmonary nodules utilizing medical computed tomography scans from multiple studies are shown. In the example of FIG. 1, automated detection of pulmonary nodules on N sequential chest CTs and comparison of the CT to detect nodule changes over subsequent studies is described. Those of ordinary skill in the art should appreciate that it is only necessary that the studies be independent and that they take place at different points in time (such that CT images generated in each of the different studies are generated at different points in time).

The process is initiated by sequentially conducting a series of studies denoted as 2a–2N. A first one of the studies, here study 2a, is processed. The particular manner in which study 2a is processed will be described below in conjunction with FIGS. 2 and 3. Suffice it here to say that CT images "slices" are examined, classified and tabulated to determine the existence of a nodule in a CT image.

After the study is processed, then a next study is selected and similarly processed. It should be noted that in some applications, it may be desirable to process each of the studies sequentially while in other applications, it may be desirable to process fewer than all of the studies. For example, it may be desirable to process study 2a and then process study 2N and compare the results of the two studies. This procedure is repeated until all of the images from each of the N studies 2a–2N has been processed. It should be appreciated that the CT images from each of the studies 2a–2N are processed independently. That is, the CT images from the study 2a are processed independently from the CT images of study 2b. In this manner, processing of CT images from an initial study followed by processing of CT images in subsequent studies on the same patient until all N studies are analyzed independently is performed.

Figure 21:
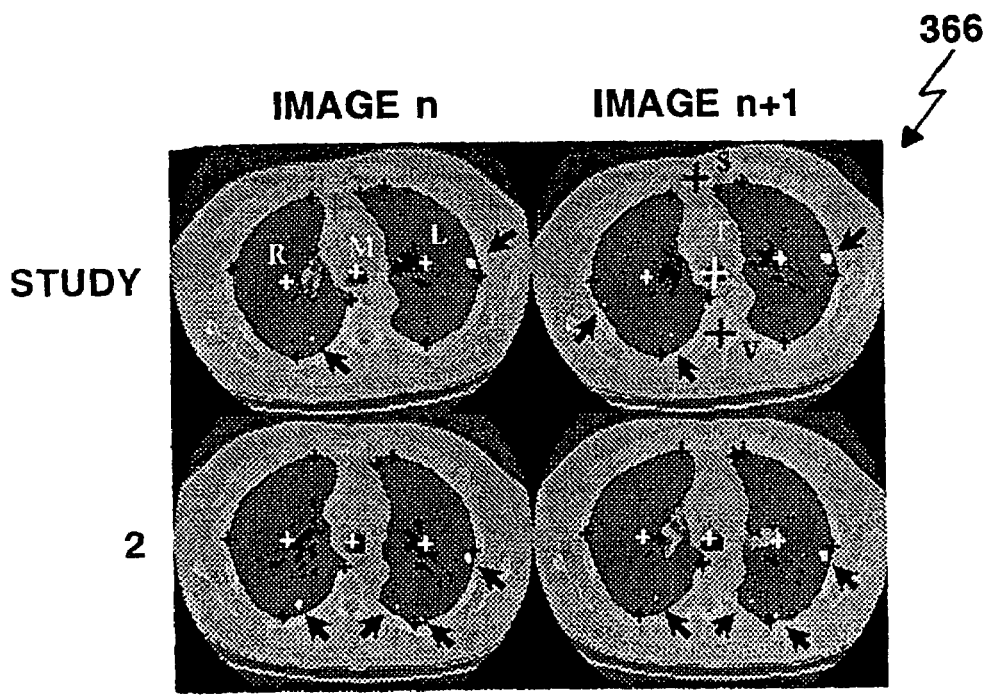
FIG. 21 is a series of images which illustrate the registration of CT images between two studies in the same patient and identification of corresponding nodules using lung centroids and anatomical features.
Figure 20:
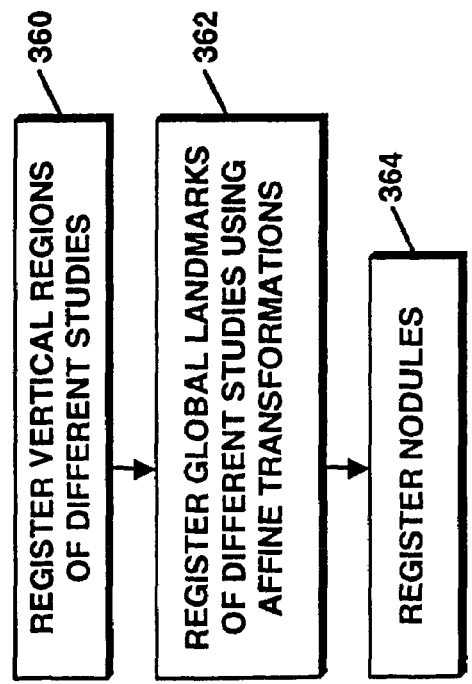
FIG. 20 is a flow diagram illustrating a process for registering images from CT scans.
Figure 19:
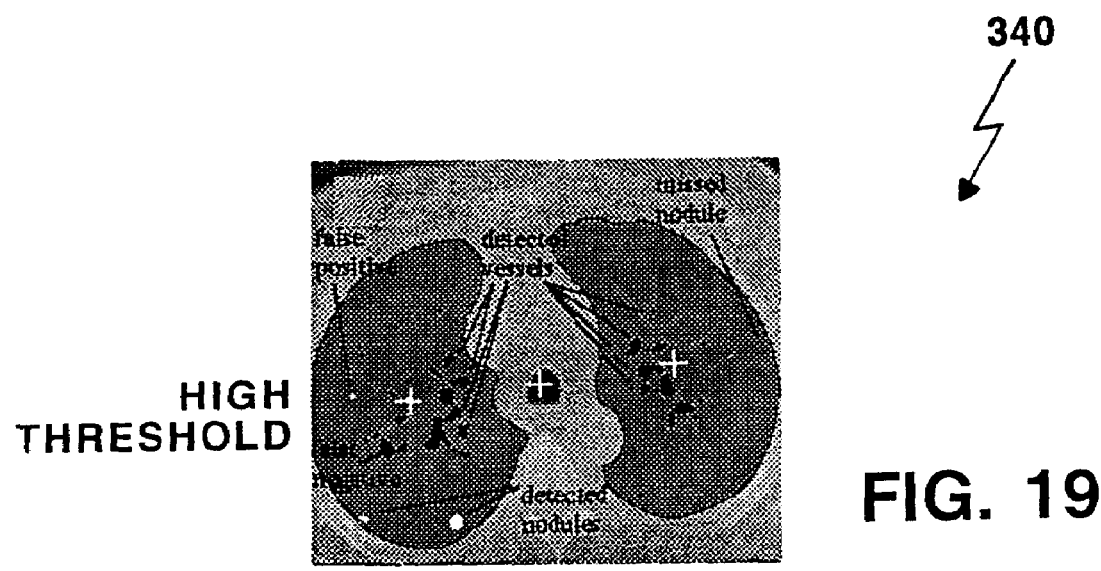
FIGS. 19A and 19B are a series of images illustrating the identification of candidate regions on CT images using different gray level thresholds.

The technique continues with step 4 in which the CT images from each of the studies 2a–2N are registered. One particular technique for performing such registration is described below in conjunction with FIG. 20 and the results of such registration are illustrated in FIGS. 19–21.

Processing then proceeds to step 6 where an output is provided. The results of the CT images generated in each of the different studies are compared for changes in nodule size and number. The system provides the radiologist with a graphical interface that enables the radiologist (or any other person examining the results) to ask comparison questions and specify certain parameters, such as nodule diameter ranges or nodule 3D positions. For example, given the results for studies i and j (wherein i, j are indices used to denote studies between study 1 and study N), the system of the present invention will answer the following questions: (1) How many nodules are visible in both studies?; (2) How many nodules in study i disappeared in study j?; (3) How many nodules do not appear in study i and are new in study j?; (4) How many of the nodules visible in both studies increased, stayed stable, or decreased? (5) How many of the nodules in study i are large (>=10 mm), medium (>=5 mm, <10 mm) or small (<5 mm) and similarly in study j? (6) How many large/medium/small nodules in study i are still large/medium/small in study j? (7) How many large nodules in study i became medium or small nodules in study j? (8) How many nodules with diameter between 3 and 6 mm in study i changed size in study j? (9) How many nodules in the base of the lung increased, decreased, or stayed stable? (10) How many nodules in the apex of the lung increased, decreased, or stayed stable? (11) How many nodules adjacent to the lung border increased, decreased, or stayed stable? (12) What is the average of all nodule size changes in studies i and j?

Processing then flows to step 8 where an output is provided. The output may be provided in any format convenient to a user of the system. For example, the output may be provided as a tabulation of nodule growth. Processing then ends.

Referring now to FIG. 1A, a system for detecting, comparing and determining volumetric quantification of pulmonary nodules on medical computed tomography (CT) scans 10 includes a computed tomography (CT) imaging system 12 having a database 14 coupled thereto. As is known, the CT system 10 produces two-dimensional images of cross-sections of regions of the human body by measuring attenuation of X-rays through a cross-section of the body. The images are stored as digital images in the image database 14. A series of such two-dimensional images can be combined to provide a three-dimensional image of a body part of interest such as a lung. A user interface 16 allows a user to operate the CT system and also allows the user to access and view the images stored in the image database.

A registration processor 18 is coupled to the image database 14 and the user interface 16. The registration processor 18 receives image data from the image database 14 and processes the images to digitally align multiple images (including alignment of images between multiple studies). The registration processor 18 can then store the aligned images back into the image database 14. The particular manner in which the registration processor 18 processes the images to align structures within the images will be described in detail below in conjunction with FIGS. 4–20. Suffice it here to say that since the registration processor 18 digitally aligns the structures shown within the CT images generated during CT scans performed at different points in time, the existence of nodules or other irregularities in the anatomy of the structure represented in the CT images can be detected and analyzed rapidly and accurately.

Also coupled between the image database 14 and the user interface 16 is an automated classification processor 20 which includes a lung detection processor and a nodule detection processor. The classification processor 20 receives image data from the image database and processes the image data to detect, compare and determine volumetric quantification of pulmonary nodules on medical computed tomography (CT) scans. The classification processor 20 can if desired pre-screen each image in the database 14 such that an examiner (e.g. a doctor) need not examine every image but rather can focus attenuation on a subset of the images possibly having nodules or other irregularities. On the other hand, a physician or radiologist can examine a case and use the system of the present invention as a check to ensure that no nodules are missed. Since the CT system 10 generates a relatively large number of images for each patient, the examiner is allowed more time to focus on those images in which it is most likely to detect a nodule or other irregularity in the structure which is the subject of the CT scan (e.g. the lungs). The particular manner in which the classification processor 20 processes the images to detect and/or identify nodules in the images will be described in detail below in conjunction with FIGS. 2–22. Suffice it here to say that the classification processor 20 can be used to process two-dimensional or three-dimensional images of a structure.

Figure 2:
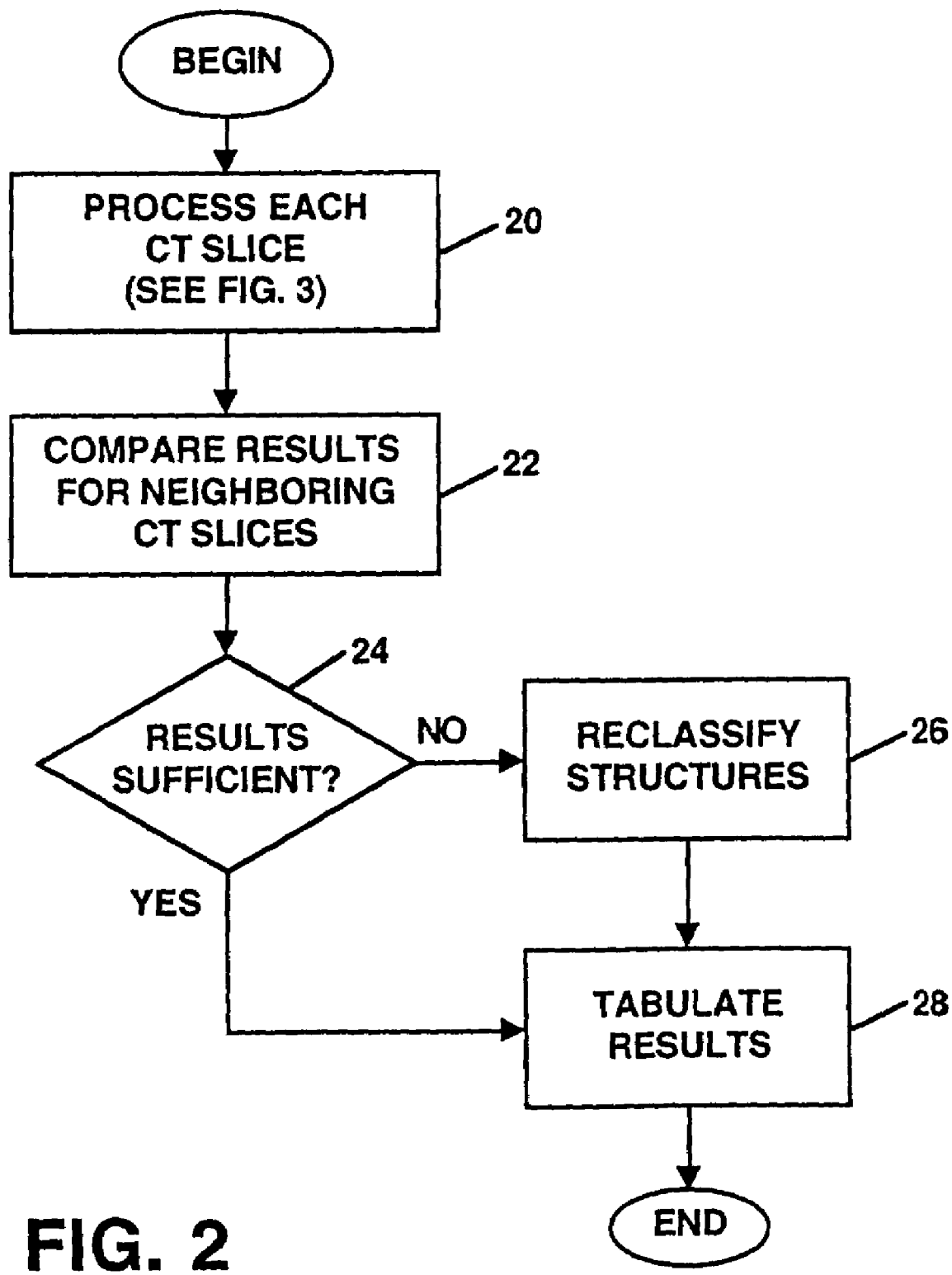
FIG. 2 is a flow diagram illustrating the processing of one CT study.

Referring now to FIG. 2, the steps to process one or more CT images from an individual CT study are shown. Processing begins in step 20 in which each individual image is processed to identify structures that are potentially nodules. The particular manner in which this is accomplished in describe below in conjunction with FIG. 3. Suffice it here to say that, generally, a search of CT image "slices" is performed to identify structures having one or more predetermined characteristics. This is done by processing a first CT slice to locate and clarify lung structures. Subsequently one or more CT slices above and/or below the processed slice are processed to again identify and clarify structures. In this manner structures which appear in multiple images are identified.

After relevant CT images slices are found, processing proceeds to step 22 in which the results of the search are compared with search results from CT images adjacent to those images having structures with one or more of the predetermined characteristics. Pixels included in the same structure in neighboring CT images are then registered using a technique described below in conjunction with FIGS. 6 through 9 below. Thus, step 22 corresponds to a technique for aligning CT scans taken in a single study. Generally, a lung structure detected on a CT image is aligned with the same structure on neighboring CT images if visible. This process takes the slice thickness and the 3D position of the structure within the lung into account as described in FIGS. 6–9, but also FIGS. 5 and 16 (vertical and horizontal regions).

Processing then proceeds to decision block 24 in which a decision is made as to whether the results are considered as sufficient. In particular, if the structure belongs to the same "class" in consecutive images the results are considered sufficient and are tabulated as shown in step 28. Otherwise, the structures as reclassified as shown in step 26 and processing again proceeds to step 28

In this particular embodiment, three classes are used. The classes are defined as one of "vessel," "potential nodule" or "nodule." A structure classified in one image as a vessel is reclassified as a potential nodule if it is identified as a nodule in a neighboring image. Correspondingly, a structure classified in one image as a potential nodule is reclassified as a nodule if it is identified as a nodule in a neighboring slice.

Figure 3:
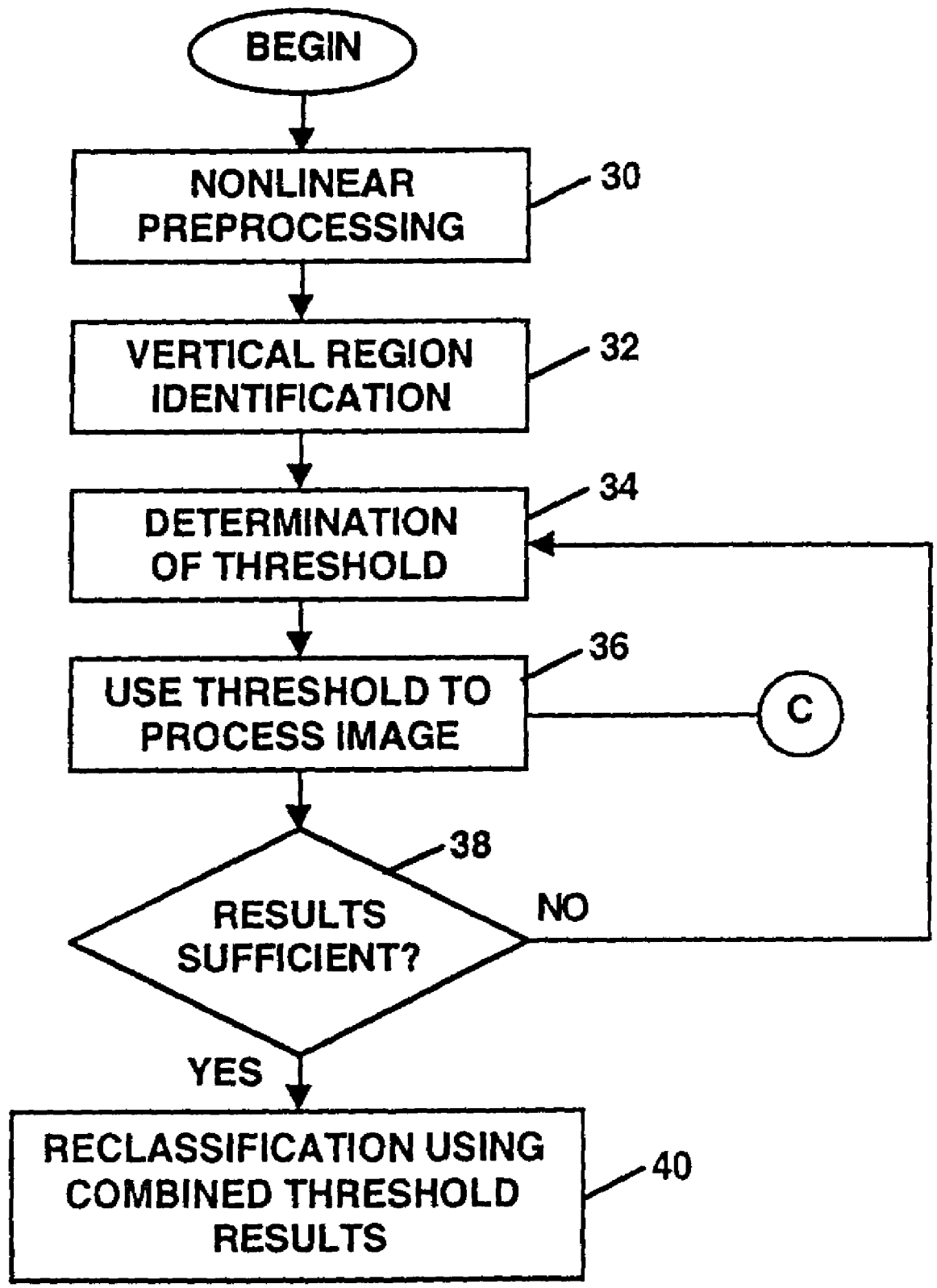
FIG. 3 is a flow diagram illustrating processing used to classify structures identified in CT images.

Referring now to FIG. 3, the steps for processing an individual image within a CT study are shown. This technique may be similar to that used in step 20 of FIG. 2.

Processing begins at step 30 in which a CT image is pre-processed by a nonlinear process to provide pre-processed image data (PPID), and a corresponding image representation. The CT image is composed of pixel data with each pixel represented by a 16 bit (two byte) value. The PPID are 8 bit (one byte) pixel values. The pre-processing thus reduces the amount of data which must be later processed.

In this particular embodiment, to begin the pre-processing, 16 bit CT pixel values above $2^{15}$, which represent the data outside of the field of view, are set to zero. Most commonly, only $2^{12}$ or even $2^{11}$ gray level values are used by the CT scanner to encode the measured density levels. The pixels are further pre-processed by mathematically taking the square roots of the pixel data to obtain pixel data that can be represented in $2^8$, (or 255), gray levels. Square root processing is a nonlinear transformation that reduces high brightness values proportionally more than low brightness values. This process results in a conversion from the original 16 bit CT image pixel data to 8 bit pre-processed image data, PPID.

After the PPID data is obtained, processing proceeds to step 32 where the CT image data is further processed to identify from which of several vertical regions the data came. In this particular embodiment of this invention, five classifications of vertical lung position (VLP), are used. These five regions are identified in FIG. 5 and the process of classification into one of the five vertical lung regions is described in more detail below in conjunction with FIG. 3B. Let it suffice to say here, that in this embodiment, the classification resulting in particular vertical lung position is indicative of a nodule.

Processing next proceeds to step 34 in which an initial threshold is determined and the CT image data is processed with the application of the initial threshold. The initial threshold can be selected using empirical techniques by examining attenuation values for lung and air. It is desirable to select the lowest threshold possible to include all of the lung structures. It should be appreciated, however, that by selecting a threshold which is too low, other soft tissue structures could be included in the lung. On the other hand, if the selected threshold is too high, the lung border will be missed. Thus, in selecting a threshold value, a tradeoff is made between selecting a value which does not capture all of the lung and nodule structures and a value which captures structures outside of the lung.

Processing then proceeds to step 36 in which the threshold is used to process the image. In particular, the threshold is used to divide the image data values into two sets, (one with higher and one with lower attenuation).

Subsets of pixels which are relatively light in color represent normal structures (vessels, bronchi) and lung pathology (nodules) and a darker subset represents the aerated lung. In this embodiment, in order to find nodules that are larger than or smaller than the slice thickness, various gray-level thresholds are used to create the plurality of binary image data, BID. Thus, in step 36 a threshold is used to process the image to convert the 16 bit CT image data into single bit binary pre-processed image data, BID which facilitates detection of the lung border.

The processing performed in step 36 will be described in further detail below in conjunction with FIG. 4. Briefly, however, in the processing of step 36, the anatomical areas of interest are first determined. In this example, the lungs are the areas of interest. Next geometrical characteristics of the features within the borders of the lung are found. Generally, any objects within the borders of the lung are characterized for roundness and volume. Particular roundness and volumes are indicative of s nodules. In a third part of the processing which takes place in step 36, the horizontal planar lung position (PLP) is determined where a given feature is found. This method is further described below in conjunction with FIGS. 4 and 17A. Suffice it here to say that the lung may be horizontally divided into regions. Objects which appear in certain horizontal regions within the lung border are indicative of nodules.

In step 38 a decision is made as to whether the results computed in step 34 are sufficient. If the results are not sufficient, then step 38 implements a loop back to step 34. Various thresholds may be applied at step 34 by way of the decision at step 38 to produce a plurality of BID binary data. Each of the BID data is processed further at step 36 to determine its quality. One important consideration is to determine whether the results are sufficient is whether the lung border is well defined and whether the image includes detectable features.

If in decision block 38, decision is made that the results are sufficient, then processing proceeds to step 40 where each feature is classified within the plurality of threshold data, BID. Each thresholded BID image may contain different candidate regions, "vessel," "potential nodule" or "nodule." Such classifications may be different from those within the same image at another threshold.

Results obtained at a given threshold level are compared to the results obtained at the next threshold level. Differences between those results are then used to establish if further processing is needed. Processing data using higher threshold values, vessels that are falsely classified as nodules are reclassified as vessels once lower thresholds are applied. Similarly, faint nodules that are missed with high thresholds are detected using low thresholds. Let it suffice to say that the BID data, at the various thresholds, is examined automatically.

In this embodiment, as had been described in conjunction with FIG. 3 step 40, various information is used to classify features within the BID image at one given threshold. Such information, previously described, comprises vertical position within the lung, horizontal position within the lung, feature roundness or shape, and feature volume. The classification results are tabularized at step 40. It should be appreciated that the classification results obtained at step 40 in FIG. 3 may be the same as those referred to in step 28 of FIG. 2.

The final re-classification matrix at step 40 may include many forms. For one particular embodiment of this invention related to detection of pulmonary nodules and to volumetric assessment and quantification of nodule change over time in computed tomography (CT) images of the thorax, five criteria have been established. The five criteria are as follows: (1) if a structure is classified as a vessel in all BID thresholded images, it is finally re-classified as a vessel; (2) if a structure is classified as a nodule in all BID thresholded images, it is finally re-classified as a nodule; (3) if a structure is classified as a nodule in some images and potential nodule at other images thresholds, it is finally re-classified as a nodule; (4) if a structure is classified as a potential nodule in some images and a vessel in others, it is finally re-classified as a potential nodule; and (5) if a structure is classified as a nodule in some images and a vessel in others, it is finally re-classified as a nodule. Those of ordinary skill in the art should appreciate that although the above five criteria have been used in this application, other criteria may be used in this and in other applications.

It should be understood that the number of thresholds which may be applied to the CT image data (e.g. in steps 34–38) depends upon a variety of factors including but not limited to the required accuracy of the system and the time available for computation. The more accurate the required results, the more thresholds are needed and the longer the processing takes. There is thus a trade-off between accuracy and processing speed that must be considered. In this embodiment, a sequence of threshold values starting at 300 and involving every tenth level, i.e., 310, 320, 330, . . . until 800, has been shown to yield accurate results.

It should also be noted that in this particular embodiment, it has been determined that a threshold value of 500 will segment the image sufficiently for most nodules, especially nodules that fill the entire slice thickness. Therefore, if processing time is restricted, thresholds near a value of 500 may be optimum.

Figure 3A:
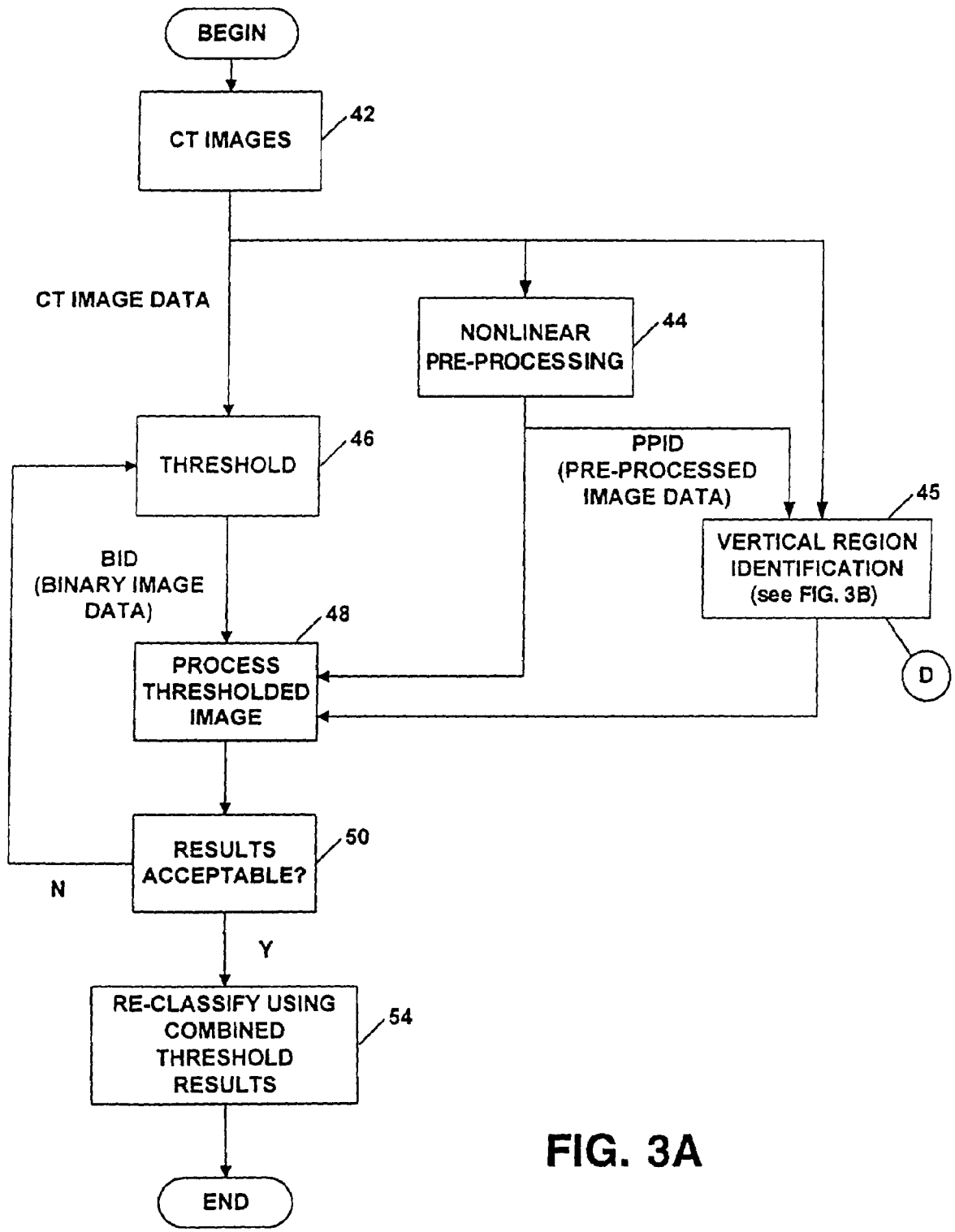
FIG. 3A is a flow diagram illustrating the repeated processing of a CT image at different threshold levels.

Referring now to FIG. 3A, the steps for processing an individual image within a CT study are again shown but are represented as steps operating on particular data types. The data types correspond to the CT Image data, pre-processed image data (PPID), and binary image data (BID) are described above in conjunction with FIG. 3. Those of ordinary skill in the art should appreciate that processing described in the steps below could be performed on CT image data (i.e. a full set of image data). The decision to use binary image data was made for processing convenience and to increase processing speed since it is desirable to provide an output to a radiologist or other user of the system as rapidly as possible.

Processing begins in step 42 in which CT images provided from CT image data are obtained.

Processing then proceeds to step 44 where the CT image data is processed using a nonlinear pre-processing technique to provide pre-processed image data (PPID). The PPID is then provided to processing steps 48 and 54. In step 54 a vertical region identification process is performed. The details of this process are provided below in conjunction with FIG. 3B.

The CT image data is then provided to step 46 where the CT image data is compared to one or more threshold values to provide binary image data (BID).

Processing then proceeds to step 48 in which the BID is processed as will be described in FIG. 4. Let it suffice to say that lung borders are traced for each thresholded data BID. Within each lung border, features are inspected for size shape and position, resulting in a preliminary (one threshold 48) and final (multiple thresholds 54) classification as to whether a feature is a vessel, a nodule or a potential nodule.

Decision block 50 implements a loop in which a determination is made as to whether the results of the processing which took place in steps 46 and 48 are acceptable. As mentioned in accordance with FIG. 3, one important consideration to that determines whether the results are sufficient is whether the lung border is well defined and whether the image includes detectable features.

If the results are deemed acceptable, then processing proceeds to step 54 in which the data from the multiple thresholded and processed BID images is correlated and compared to result in a final classification (see step 40 FIG. 3).

Processing then ends.

It should be appreciated that in this embodiment, the PPID data generated in step 44 is used for the vertical region identification, step 45. It should also be noted that at step 48, that the vertical region identification data of step 45 is used as one of pieces of information, among others, in the classification of features within images.

Figure 3B:
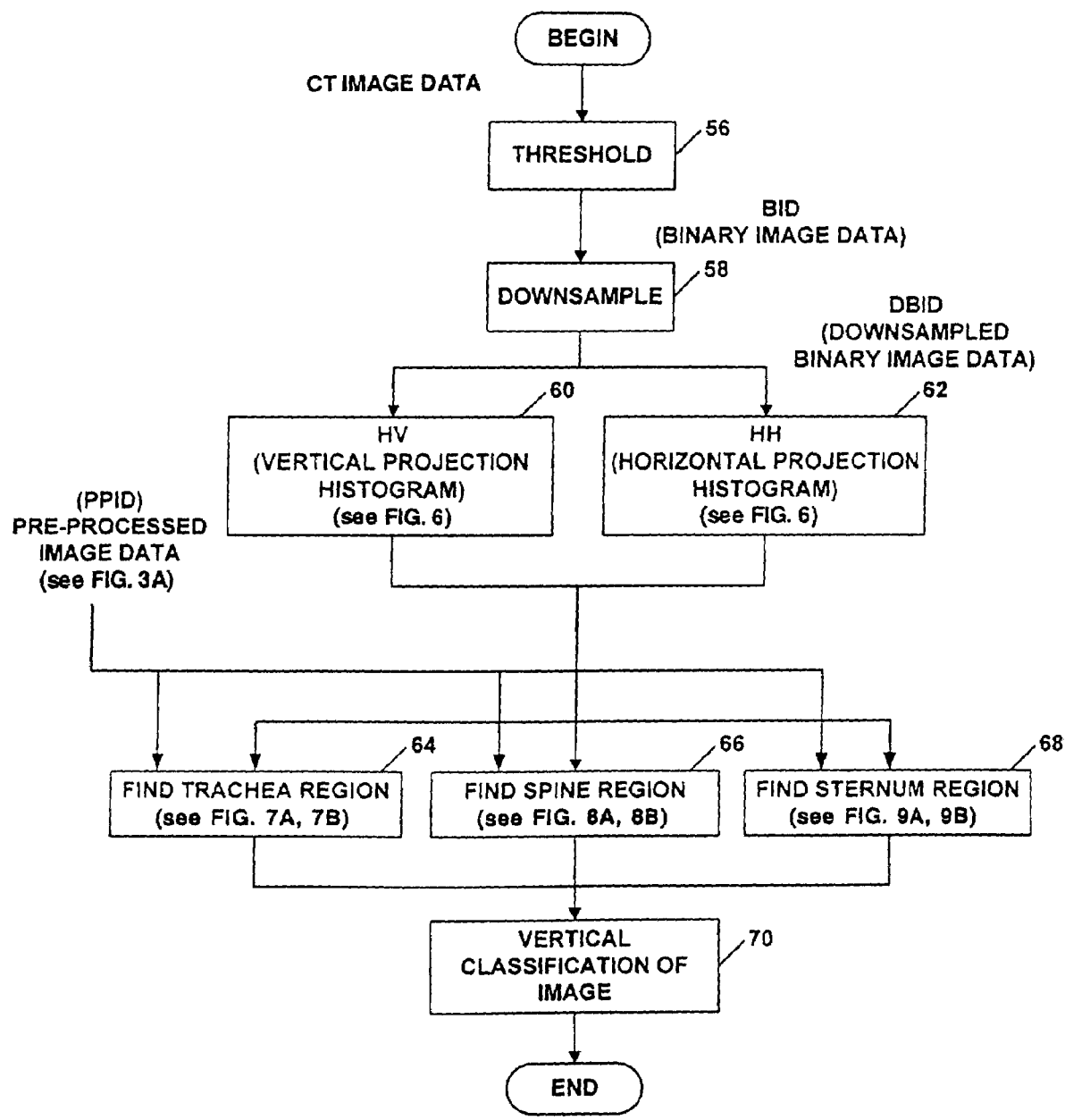
FIG. 3B is a flow diagram illustrating the process of classification of the CT image into one of a plurality of vertical regions.

Referring to now to FIG. 3B, the steps are shown which describe the process by which the vertical region of a CT image is identified. The CT image under examination is classified in terms of the vertical region of the thorax which it represents. In this particular embodiment, five classifications of vertical region are used. These regions are further shown in FIG. 5.

At FIG. 3B, step 56, the CT image data, obtained as previously described, is threshold to produce a binary representation of the image, binary image data, (BID). In this particular embodiment, this thresholding is distinct from that done earlier, in FIG. 3A. Here a threshold which has been shown to produce acceptable results can be used. In practice a fixed threshold of 500 was used, unlike the numerous thresholds which were used in FIG. 3A. The resulting BID data however, like the BID of FIG. 3A, is a binary thresholded version of the full 16 bit data CT image.

At step 58, the BID data is downsampled to produce downsampled binary image data (DBID). In this particular embodiment, the down sampling is performed by taking every tenth pixel of the binary image data, BID, of the thorax. Those of ordinary skill in the art should appreciate, however, that other downsampling intervals can also be used. The particular interval should be selected in accordance with a variety of factors, including but not limited to processing speed. It is desirable to provide a system which can produce acceptable results in a period of time comparable to that required for conventional or manual examination of the CT images. The downsampling method at step 58 is further described in FIG. 6. Suffice it here to say that downsampling results in a lower resolution image representation as may be seen in FIG. 6.

Processing then proceeds to steps 60 and 62 where histograms of the horizontal and the vertical projections of the downsampled image data are generated. These histograms are used to identify particular horizontal regions in the horizontal plane within the CT image. Representative histograms may be seen in FIG. 6. Suffice it here to say that histograms are generated by counting the number of dark pixels along vertical or horizontal projections of the DBID images. Such histograms are representative of the pixel density along these projections.

At step 64, the trachea region of the DBID downsampled image is identified by way of features of the vertical and horizontal projection histograms. This method is described in FIG. 8. Let it suffice to say that an area of the DBID image is identified in which the trachea is found.

At step 66, the spine region of the DBID downsampled image is similarly identified by way of features of the vertical and horizontal projection histograms. This method is described in FIG. 7. Let it suffice to say that an area of the DBID image is identified in which the spine is found.

At step 68, the sternum region of the DBID downsampled image is similarly identified by way of features of the vertical and horizontal projection histograms. This method is described in FIG. 9. Let it suffice to say that an area of the DBID image is identified in which the sternum is found. Sub-regions were identified at steps 64, 66 and 68 to help localize anatomical features. This reduces the chance of a mismatch (i.e. improve the accuracy with which structure and identified).

At step 70, the trachea, spine, and sternum regions identified in the DBID pixels are first transposed to the PPID data, then compared with multiple templates of PPID type image data of the trachea, spine, and thorax. The DBID are extrapolated to PPID images for the comparison operation. As the templates are at known vertical positions within the thorax, the templates which best fit the identified regions of the particular DBID image are indicative of the vertical position of the DBID data. In this embodiment, five vertical regions are used, and five sets of corresponding templates are employed. In this way, each CT image may be classified as belonging to one of the five vertical regions within the thorax. This method is further described in relation to FIGS. 7 though 9.

As previously indicated, the vertical region identification information 70 is combined with other information to provide a classification of features within the CT image as being either "vessel," "potential nodule" or "nodule."

Figure 4:
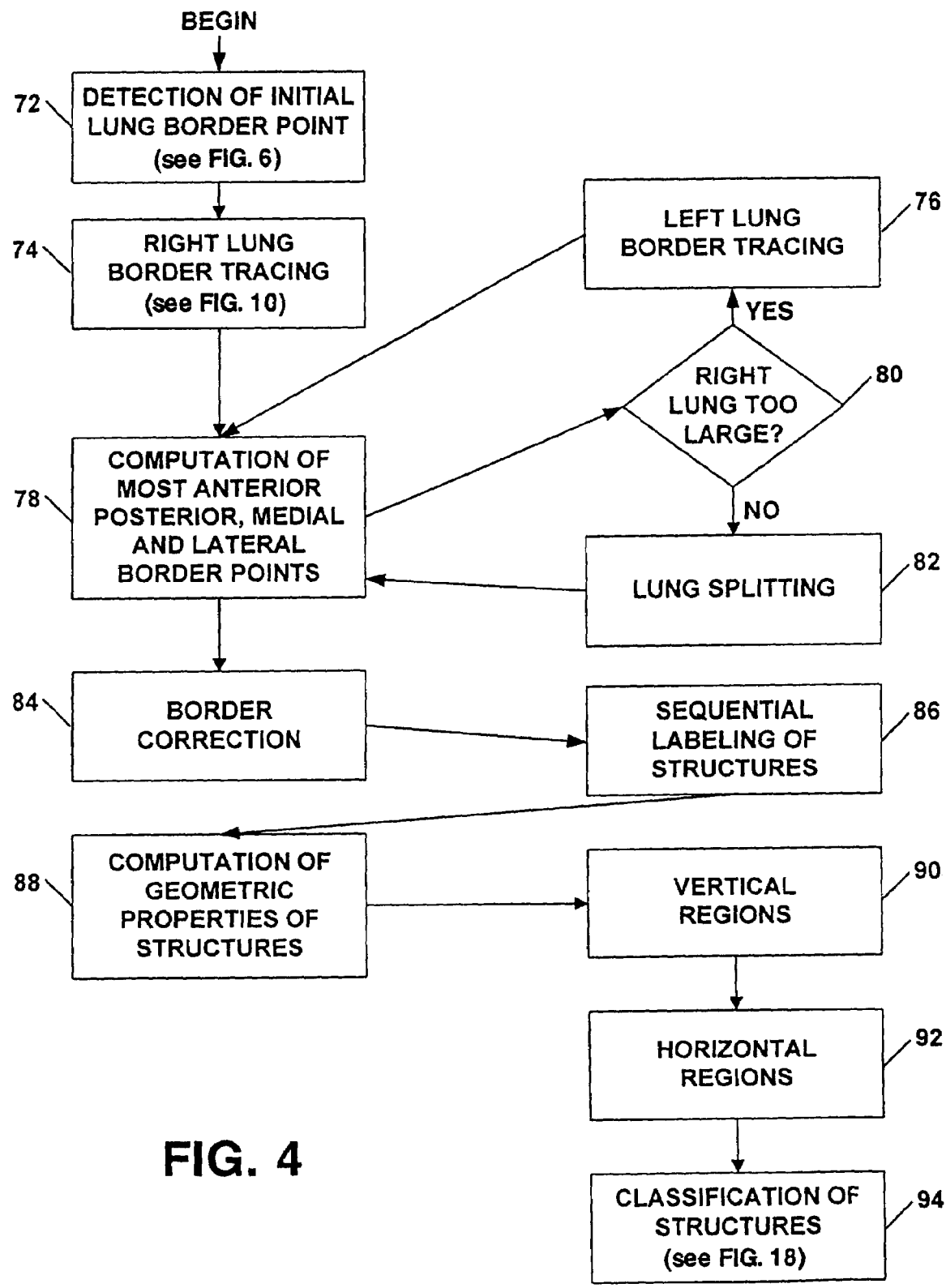
FIG. 4 is a flow diagram illustrating the processing of a CT image for a particular threshold level.

Referring now to FIG. 4, a process for classifying structures in a lung begins by detecting an initial lung border point as shown in step 72. Each initial border point serves as the start point for tracing of the lung border. The process of detecting an initial lung border point begins by first detecting a thorax. A technique and histograms for detecting the thorax and an initial lung border point is described in detail below in conjunction with FIG. 6.

After the detection of the initial lung border point, the right lung border is traced as shown in step 74. The details of lung border tracing process are provided below in conjunction with FIG. 10. In this particular embodiment, the detection of the outline of the right lung is performed first (i.e. the right lung is traced first). Since pixels are stored consecutively from left to right, and the right lung appears on the left in the image, processing speed is improved by processing the right lung first. Those of ordinary skill in the art should recognize, however, that in other embodiments, it may be desirable or necessary to detect the outline of the left lung first. It should also be appreciated that the right lung appears on the left side in the CT images shown herein.

Processing then proceeds to step 78 where the right lung's most anterior, posterior, medial and lateral pixels are identified. Next processing flows to decision block 80 where a determination is made as to whether the right lung appears larger than a predetermined threshold. The lung may appear too large, for example, if both lungs were considered as one lung in the lung tracing process of step 74. This problem occurs more frequently in a patient with emphysema whose lungs are hyperlucent and hyperinflated. The anterior junction line in such a patient is thin and longer and is less apparent to the system. If decision is made that the right lung is too large, then processing proceeds to step 82 where the image of the lung is split. The particular manner in which the lungs are split is described below in conjunction with FIG. 12. Processing then returns again to step 78 in which the right and left lung's most anterior, posterior, medial and lateral are then correctly identified.

If decision is made is step 80 that the right lung is not too large, (i.e. lung splitting is not needed), then processing proceeds to step 76 and the left lung is traced immediately after the right lung, and its anterior, posterior, medial and lateral pixels are then identified.

Processing then proceeds to step 84 in which border correction is performed. The particular manner in which border correction is performed is described below in conjunction with FIG. 11.

Processing then proceeds to step 86 in which sequential labeling of structures is performed to determine candidate regions that contain vessels and potential nodules. The particular technique for determining candidate regions that contain vessels and potential nodules is described below in conjunction with FIG. 15.

Processing then proceeds to step 88 in which geometric properties of structures are computed. The geometric properties include the feature size, a circular occupancy factor, horizontal position within the lung, and vertical position within the lung. It should be recognized that other features or characteristics could also be used, such as distribution of brightness of the structure, and speculation of the structure.

Figure 5:
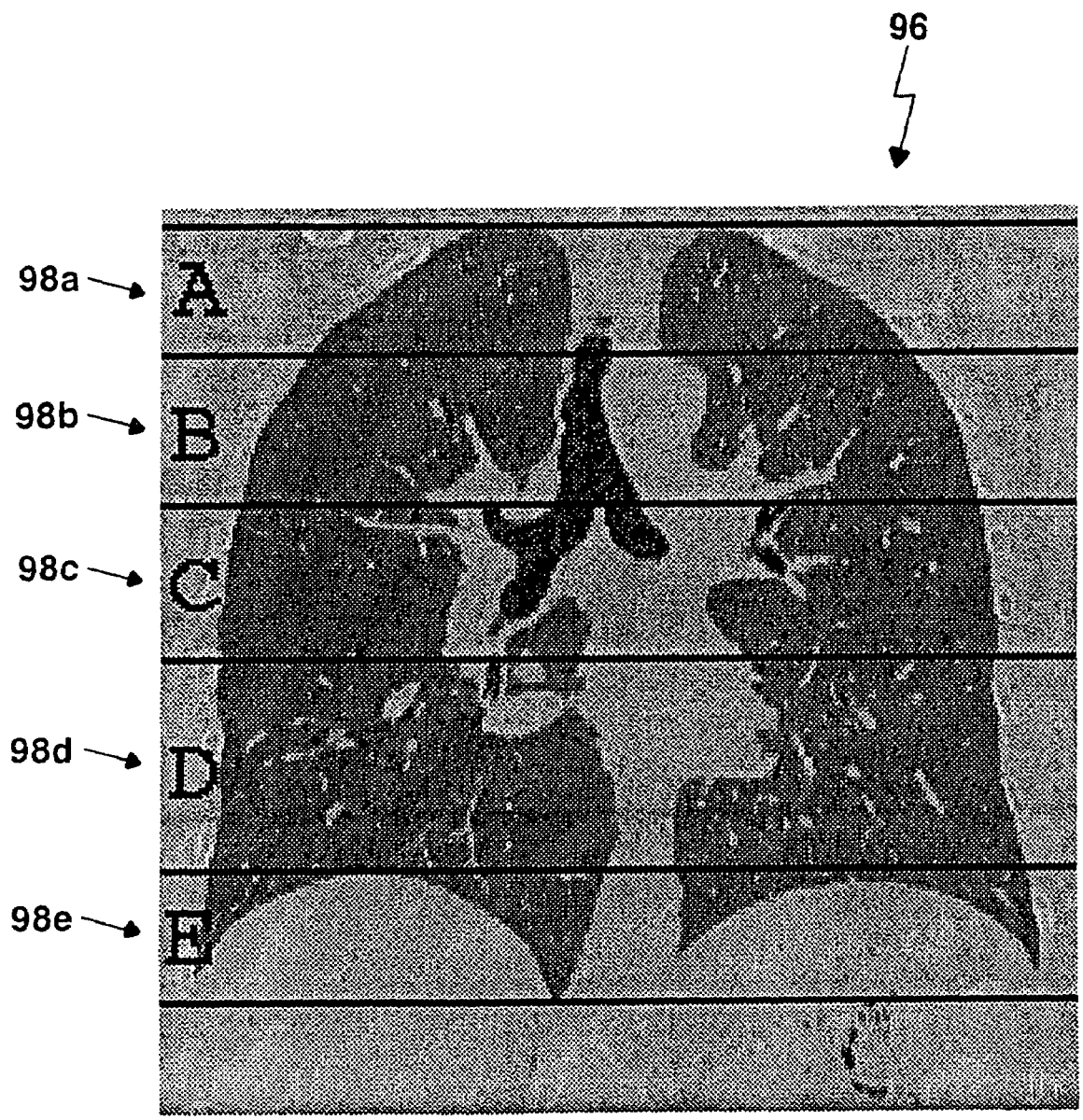
FIG. 5 is a coronal view of a lung.
Figure 16:
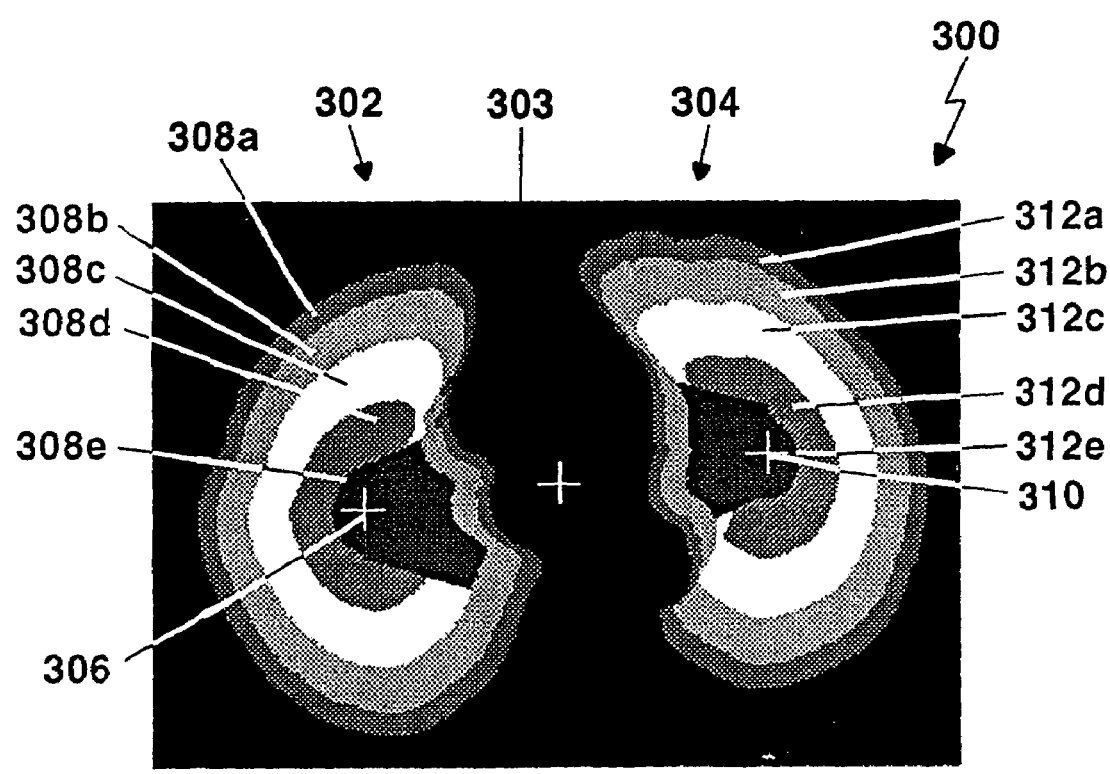
FIG. 16 is a diagram illustrating horizontal regions used for candidate region classification.

Processing then proceeds to steps 90 and 92 in which the locations of the structures are determined with respect to the vertical and horizontal lung regions that are shown in FIGS. 5 and 16.

Processing then proceeds to step 94 in which the structures are classified. The particular manner in which such classification is performed is described below in conjunction with FIG. 18.

Referring now to FIG. 5, a reconstructed CT image 96 is shown segmented into five regions 98*a*–98*e*. Region 98*a* has a top border defined by a lung apex and a bottom border defined by the top of the aortic arch. Region 98*b* has a top border defined by the top of the aortic arch and a bottom border defined by the carina. Region 98*c* has a top border defined by the carina and a bottom border defined by the left inferior pulmonary vein (not visible in this view). Region 98*d* has a top border defined by the left inferior pulmonary vein (not visible in this view) and a bottom border defined by a diaphragm dome. Region 98*e* has a top border defined by a diaphragm dome and a bottom border defined by the lowest costophrenic angle of the lung. It should be appreciated that the borders which define the vertical segments 98*a*–98*e* are chosen because of anatomical landmarks which are relatively easy to identify in a CT image.

The position of the carina is found by searching in the upper portion of the CT data set. The carina can be used to match data points between images in different studies and this data point can be used to perform such matching.

To register/match CT images between studies, the five vertical regions 98*a*–98*e* are computed for each study. During the registration process the five vertical regions in CT images from each of the different studies are first aligned. Next the slices which are grouped in each region are identified. The actual slices are then aligned to precisely match up images between studies. Typically low resolution images can be used to perform the vertical segment matching while high resolution images are used to perform the slice matching.

FIGS. 5A–5E are a series of figures which illustrate the approach of the invention to divide the lung into zones, or regions, that facilitate anatomic recognition and registration. To enable the registration of anatomical features between 2 studies, the CT images are classified to belong to one of the five regions.

Figure 5A:
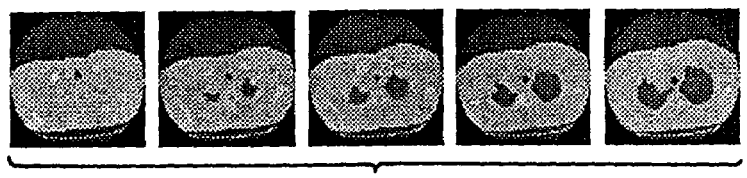
FIGS. 5A–5E are illustrations demonstrating the CT images included in the vertical lung regions used for registration of images between two different studies.

A first region is shown in FIG. 5A. The first region corresponds to a region which extends from a lung apex to the top of the aortic arch.

Figure 5B:
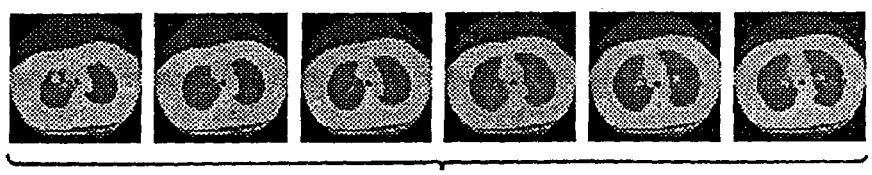

A second region is shown in FIG. 5B. The second region corresponds to a region which extends from the top of the aortic arch to the carina.

Figure 5C:
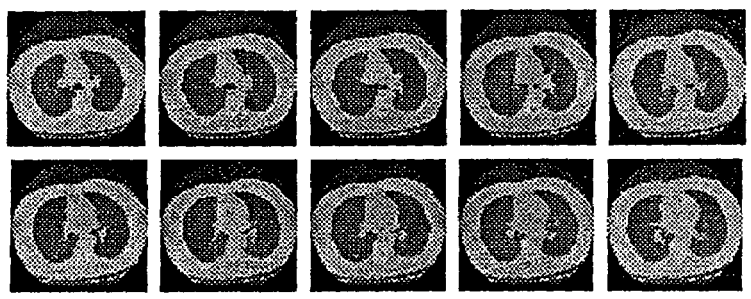

A third region is shown in FIG. 5C. The third region corresponds to a region which extends from the carina to the top of the inferior pulmonary vein.

Figure 5D:
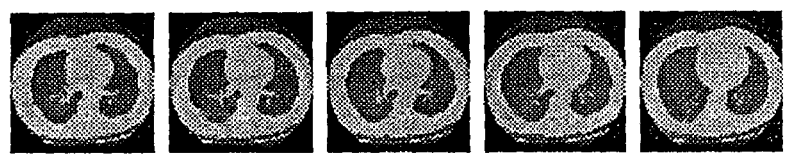

A fourth region is shown in FIG. 5D. The fourth region corresponds to a region which extends from the top of the left inferior pulmonary vein to dome of diaphragm.

Figure 5E:
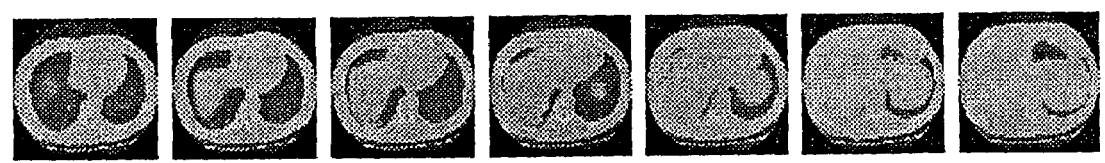

A fifth region is shown in FIG. 5E. The fifth region corresponds to a region which extends from the dome of diaphragm to lowest costophrenic angle.

Figure 6:
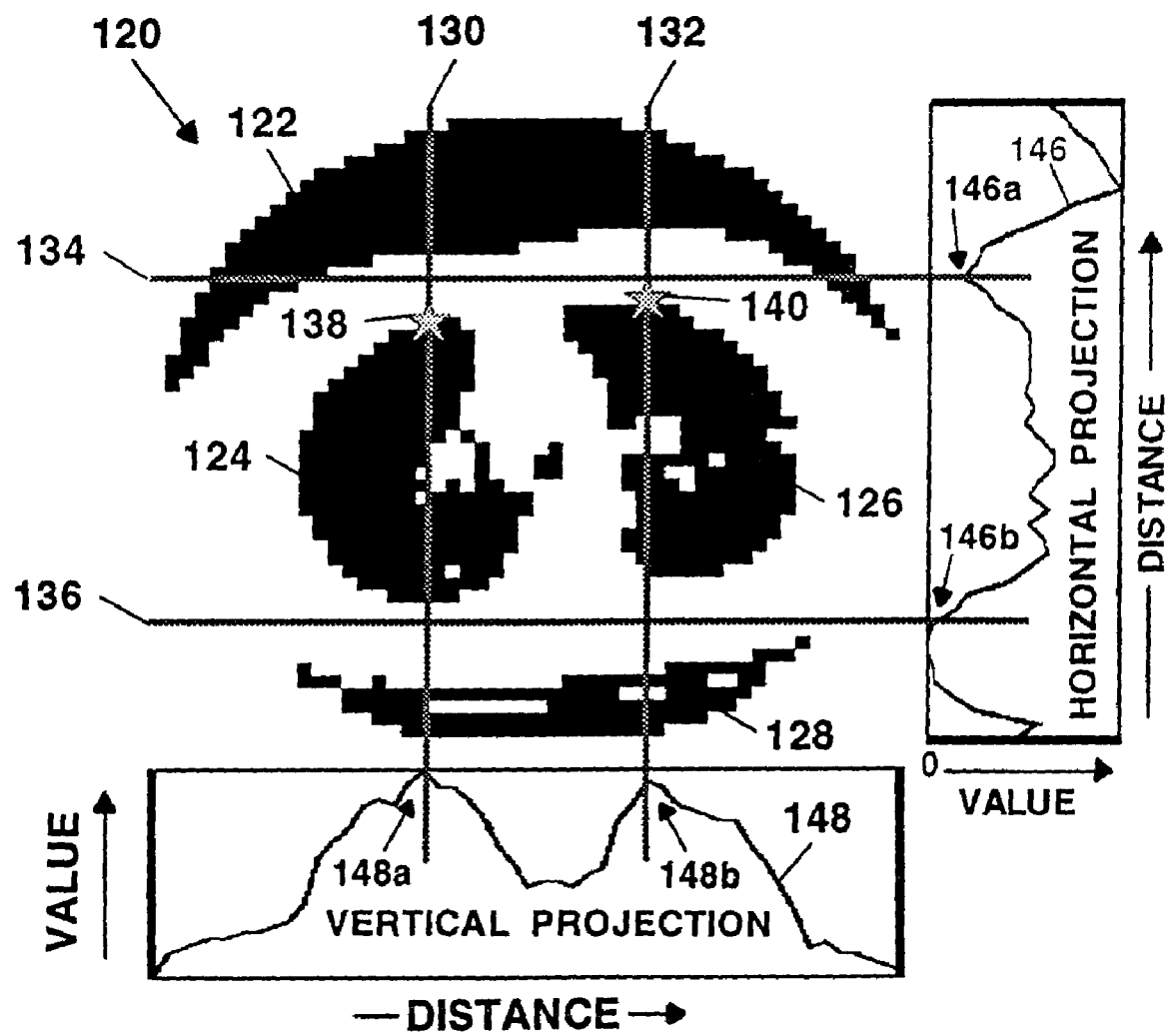
FIG. 6 is a diagram showing a down-sampled binary image (DBID) and having superimposed thereon vertical and horizontal projections used in lung detection.

The first region starts with the topmost CT image. Finding the CT slice that contains the aortic arch identifies the top of second region. The aortic arch is identified in the left lung by shape analysis of the medial border. The carina can be identified automatically by locating the slice in which the trachea splits. The inferior pulmonary vein can be located by shape analysis of large horizontal structures in the left lung. Finally, the dome of the diaphragm is found when soft tissue is identified centrally on images and increases on subsequent images in the lower part of the CT study. Referring now to FIG. 6, a plot of downsampled binary image data (DBID) 120 is shown. The DBID 120 is analyzed to find a lung starting point. The down sampling is performed automatically by taking every tenth pixel of the BID binary image of the thorax. FIG. 6 also shows horizontal and vertical projection histograms 146, 148, respectively, of the downsampled image.

The horizontal histogram 146 is computed by counting the number of black pixels, i.e. pixels representing the air in the lung or the air surrounding the body, per image row. The vertical histogram 148 is computed by counting the number of black pixels per column. The two troughs 146a, 146b in the horizontal projection histogram 146 are used to compute horizontal lines 134, 136 through the anterior and posterior part of the thorax.

The two peaks 148a, 148b in the vertical histogram 148 each represents an image column with a large accumulation of pixels that represent air. The peaks 148a, 148b are used to compute two vertical lines 130, 132 that will likely intersect the lung cross-sections. A search is then performed for the first black pixel along each vertical line starting from its intersection with the topmost horizontal line and going down. The search automatically stops at a lung-border pixel. In FIG. 6, lung region 124 has a lung border pixel 138 and lung region 126 has a lung border pixel 140. The positions of the lung border pixels 138, 140 are then converted from the down-sampled coordinates back to the original image coordinates. These positions, when transposed to the full resolution BID data, which then serve as starting points for the lung-border tracing algorithm. It should be appreciated that horizontal reference line 136 which appears near the bottom of the CT image 120 is used as a stopping criterion for the search. That is, if no lung-border pixel is found by the time the search engine reaches this line, then the search is terminated. Under this circumstance, the search is repeated for an adjacent column of pixels. This process is repeated until the lung is found.

It should be note that the lung starting point is identified within the downsampled image data and these points are then transposed to the binary pre-processed data (rather than the downsampled) to perform the lung border identification. It should also be appreciated that downsampling is done for speed.

Figure 7A:
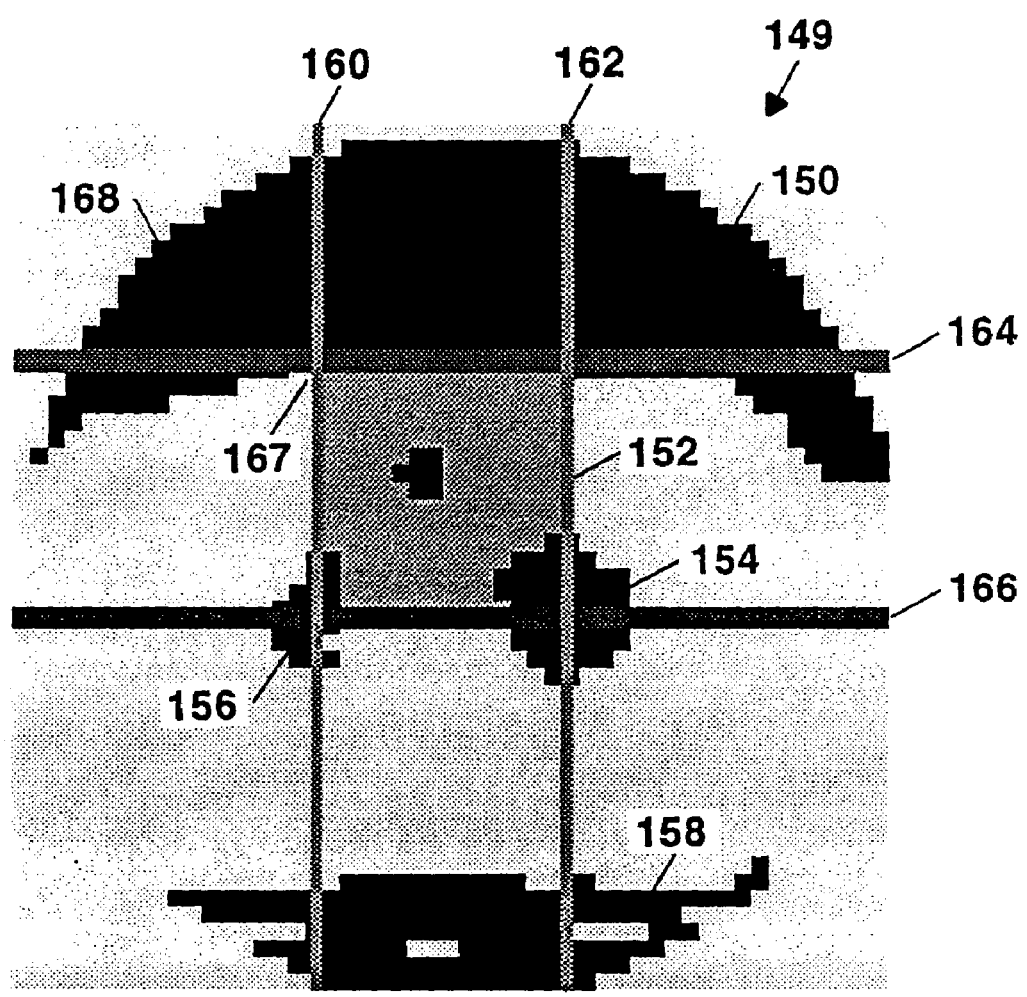
FIG. 7A is a diagram showing a down-sampled binary image (DBID) and having a defined search area in the down-sampled binary image used in trachea detection.

Referring now to FIG. 7A a plot of downsampled binary image data (DBID) 149 is shown. An identified DBID image region is transposed to the PPID image to compare against the PPID trachea template of FIG. 8B.

A region 152 on the downsampled binary image 149 is searched to find the trachea in the topmost slice in which the lungs appear. The search region 152 is defined by vertical and horizontal projections 160, 162, 164, 166 shown on the down-sampled binary image 149. As shown in FIG. 7A, the search region 152 is bordered on the sides by two vertical lines 160, 162 which are determined by the peaks in a vertical projection histogram such as the vertical projection histogram 148 described above in conjunction with FIG. 6. The top of the search region 152 is the border between the white thorax 167 and the black background 168 in the binary image 149. The horizontal line 164 defines the border between the white thorax 167 and the black background 168. The search region 152 is bordered below by the horizontal line 166 which is defined by a center peak of a vertical projection histogram such as peak 146b shown in the vertical projection histogram 146 described above in conjunction with FIG. 6.

Figure 7B:
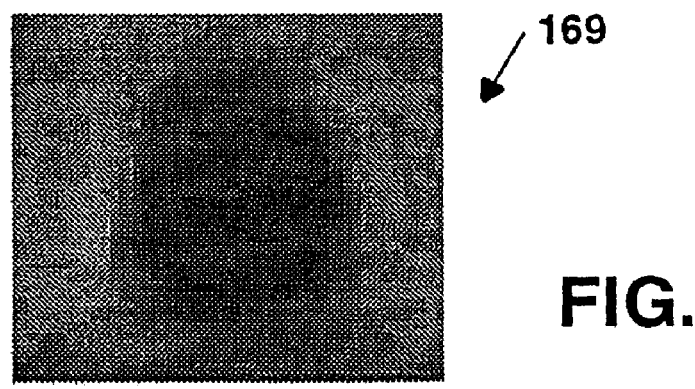
FIG. 7B corresponds to a trachea template image which is used to detect the trachea in a CT image.

Referring now to FIG. 7B, a PPID image of a trachea is used as an image template 169 to search for the trachea in the topmost slice in which the lungs appear. A normalized correlation coefficient is used to correlate the image template 169 with subimages of the CT image. The normalized correlation coefficient is used because it computes a number between −1 and 1 for each subimage that potentially contains a feature. The expected value of the normalized correlation coefficient is 0, which means no correlation. With the normalization, it is known that values near 1 mean high correlation. Thus, one can automatically find the feature in the image by looking for a normalized correlation above a value of 0.85.

In one particular embodiment, the Normalized Correlation Coefficient is Defined as:

$$\frac{(n*\text{sum\_ab} - \text{sum\_a}*\text{sum\_b})}{\left(\text{sqrt}(n*\text{sum\_aa} - \text{sum\_a}*\text{sum\_a})\ \text{sqrt}(n*\text{sum\_bb} - \text{sum\_b}*\text{sum\_b})\right)}$$

in which:

n=number of pixels in feature,

For clarity, we do not use the (row, column) notation as the pixel index, but just a number i, where i=1, . . . i=n.

a_i=value of ith pixel in PPID subimage that potentially contains feature b_i=value of ith pixel in PPID template image of feature sqrt(x) means square root of x sum_a=sum of a_i for i=1, ... i=n sum_b=sum of b_i for i=1, ... i=n sum_ab=sum of (a_i*b_i) for i=1, ... i=n (product of a_i and b_i)

sum_aa=sum of(a_i*a_i) for i=1, ... i=n (sum of a_i squared)

sum_bb=sum of(b_i*b_i) for i=1, ... i=n (sum of b_i squared)

This particular version of the normalized correlation coefficient is used because it is relatively computationally faster and more precise when compared with other versions of the normalized correlation coefficient.

Numerous subimages are located within the search region 152 (FIG. 7A) in the downsampled binary image, DBID. A coarse search first correlates the template 169 to the search region 152 at every forth pixel location in the search region 152. A fine search is then conducted that correlates the template 169 at every pixel in the local neighborhood identified by the coarse search. The trachea in the topmost CT image is then used to search for the trachea in subsequent images. The search is performed in subsequent images in a local neighborhood established using the centroid of the trachea from the previous CT slice.

Figure 8A:
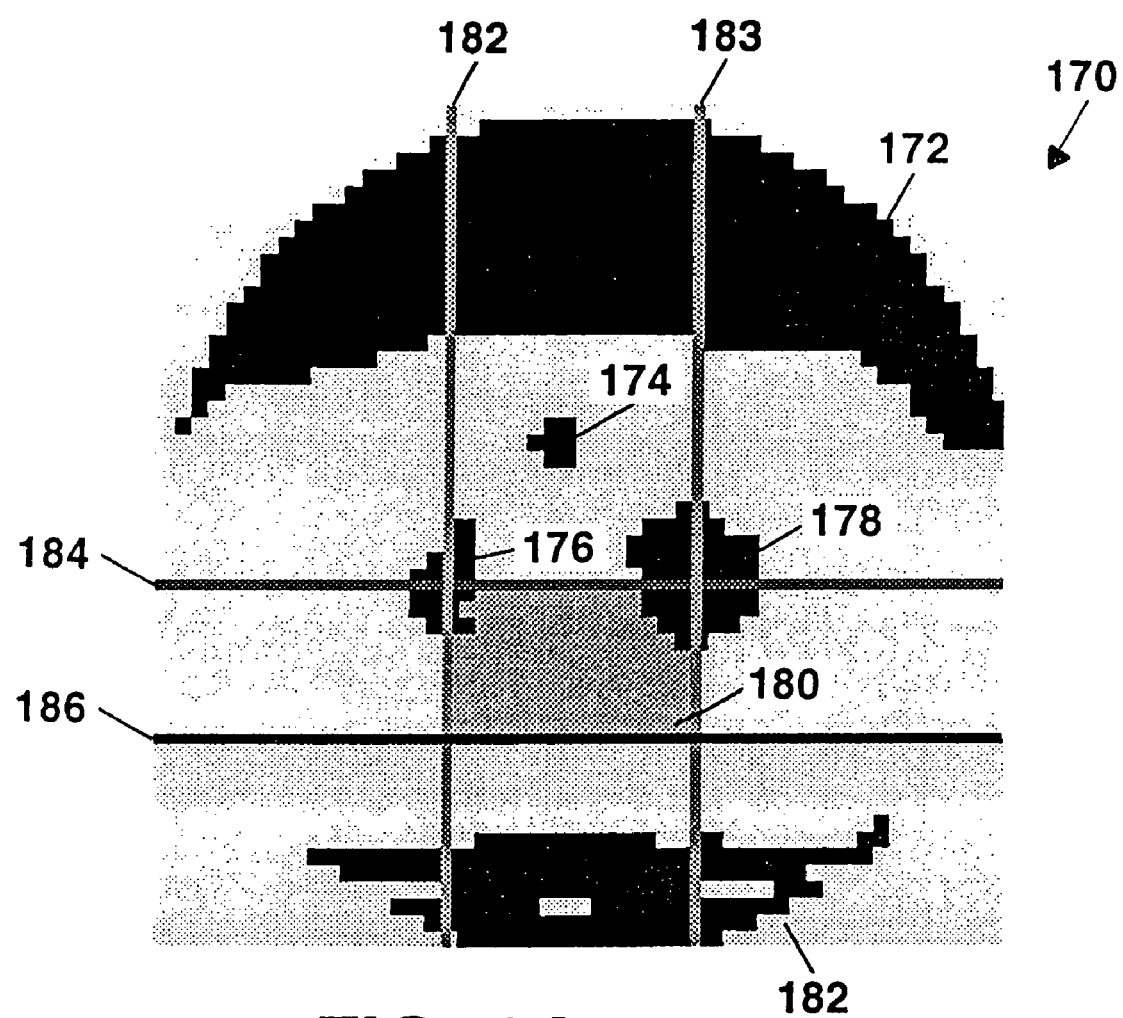
FIG. 8A is a diagram showing a down-sampled binary image (DBID) and having a defined search area in the down-sampled binary image used in vertebra detection.

Referring now to FIG. 8A a plot of downsampled binary image data (DBID) 170 is shown. An identified DBID image region is transposed to the PPID image to compare against the PPID vertebra template of FIG. 8B. A region 180 on the downsampled binary image 170 is searched to find the position of the vertebra in the topmost CT slice of the study. The search region 180 is defined by vertical and horizontal projections 182, 183, 184, 186 shown on the down-sampled binary image 170. As shown in FIG. 8A, the search region 180 is bordered on the sides by the two vertical lines 182, 183 which are determined by the peaks in a vertical projection histogram such as the vertical projection histogram 148 described above in conjunction with FIG. 6. The top of the search region 180 is defined by a center peak of a horizontal projection histogram such as peak 146a shown in the horizontal projection histogram 146 described above in conjunction with FIG. 6. The bottom of the search region 180 is defined by a lower trough in a horizontal projection histogram such as trough 146a shown in the vertical projection histogram 146 described above in conjunction with FIG. 6.

Figure 8B:
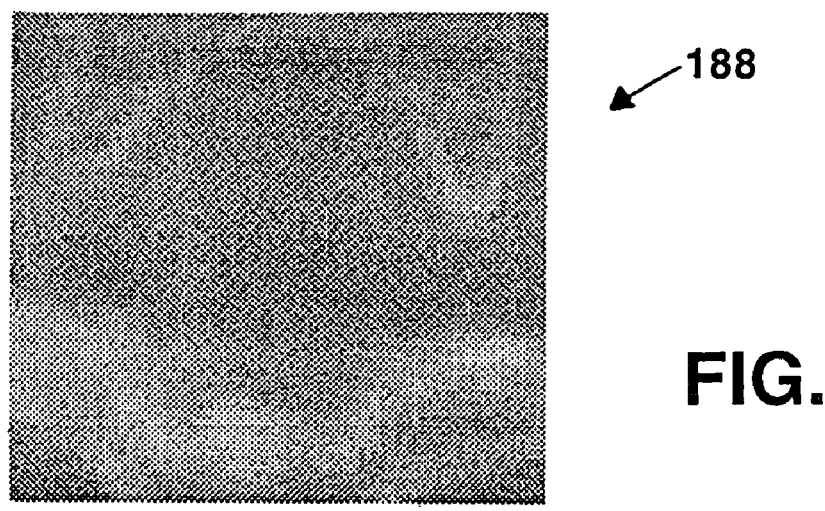
FIG. 8B corresponds to a vertebra template image which is used to detect the vertebra in a CT image.

Referring now to FIG. 8B, a vertebra PPID image is used as a vertebra template 188 to search for the spine in the topmost CT slice in which the lungs appear. A normalized correlation coefficient is used to correlate the template 188 with subimages of the CT image. The subimages are located within the search region 188 (FIG. 8A) in the downsampled binary image 170 (FIG. 8A). A coarse search first correlates the template 188 to the search region 180 at every forth pixel location in the region 180. A fine search is then conducted that correlates the template 188 at every pixel in the local neighborhood identified by the coarse search. The vertebra in the topmost CT image is then used to search for the spine in subsequent images. The search is performed in subsequent images in a local neighborhood established using the centroid of the vertebra from the previous CT slice.

Figure 9A:
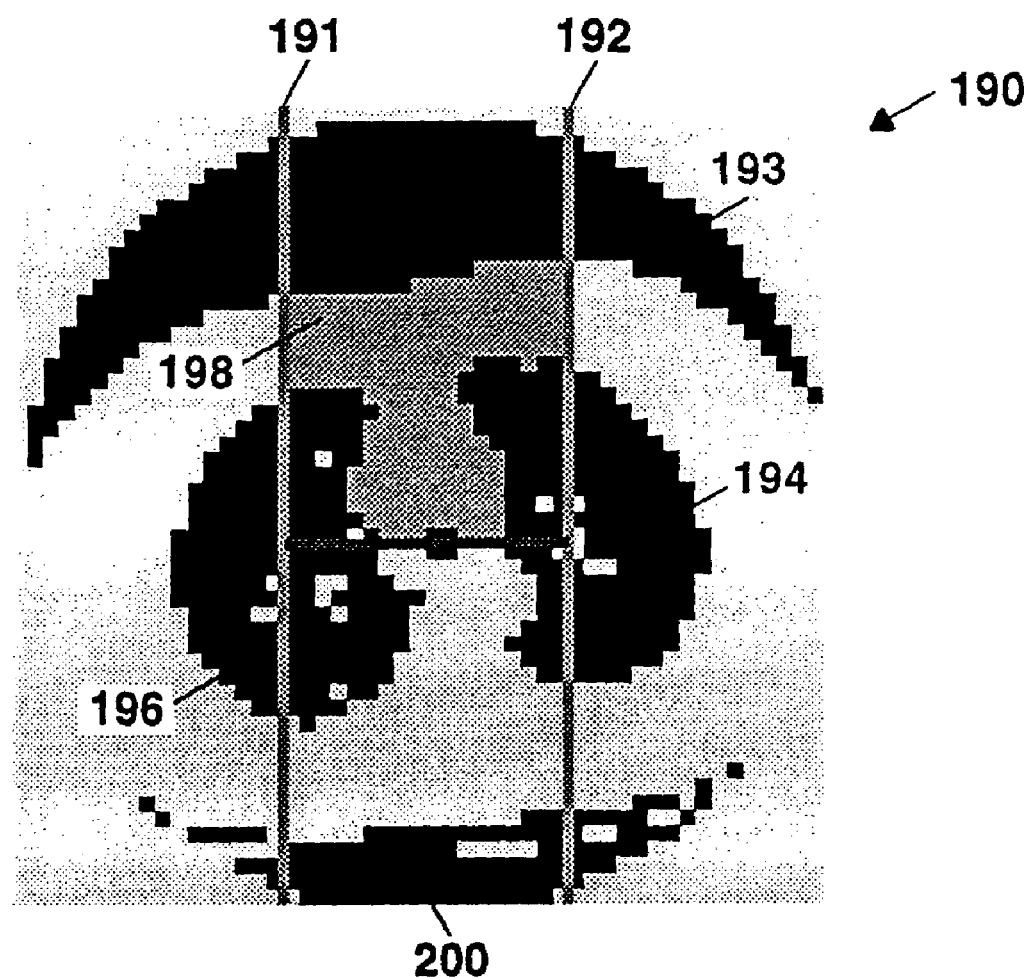
FIG. 9A is a diagram showing a down-sampled binary image (DBID) and having a defined search area in the down-sampled binary image used in sternum detection.

Referring now to FIG. 9A a plot of downsampled binary image data (DBID) 190 is shown. An identified DBID image region is transposed to the PPID image to compare against the PPID sternum template of FIG. 9B.

A region 198 on the downsampled binary image 190 is searched to find the position of the sternum in the topmost CT slice of the study. The search region 198 is defined by vertical lines 191, 192 shown on the down-sampled binary image 190. Vertical lines 191, 192 are determined by peaks in a vertical projection histogram such as the vertical projection histogram 148 described above in conjunction with FIG. 6. The top of the search region 198 is the center peak in a horizontal projection histogram such as the horizontal projection histogram 146 described above in conjunction with FIG. 6 and the bottom of the search region 198 is a lower trough in a horizontal projection histogram.

Figure 9B:
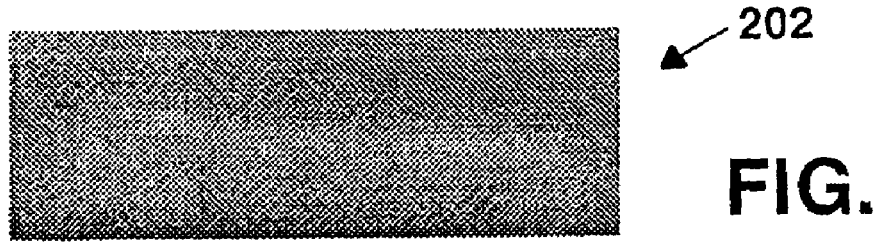
FIG. 9B corresponds to a sternum template image which is used to detect the sternum in a CT image.

Referring now to FIG. 9B a sternum PPID image is used as a template 202 to search for the sternum in the topmost CT slice in which the lungs appear. The normalized correlation coefficient is used to correlate the template 202 with subimages of the CT image. The subimages are located within the search region 198 (FIG. 9A) in the downsampled binary image 190 (FIG. 9A). A coarse search first correlates the template 202 to the search region 198 (FIG. 9A) at every forth pixel location in the region 198. A fine search is then conducted that correlates the template 202 at every pixel in the local neighborhood identified by the coarse search. The sternum in the topmost CT image is then used to search for the sternum in subsequent images. The search is performed in subsequent images in a local neighborhood established using the centroid of the sternum from the previous CT slice.

Figure 10A:
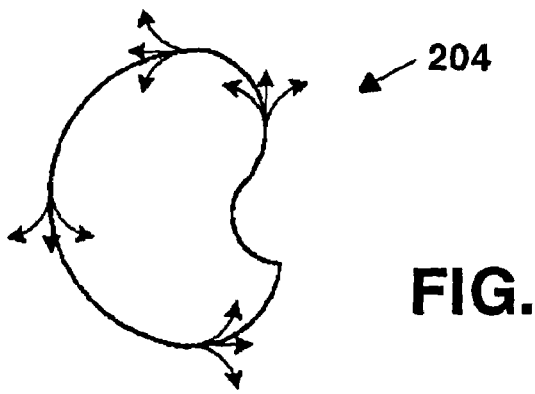
FIGS. 10A–10C are series of diagrams which describe a technique for lung border detection.
Figure 10B:
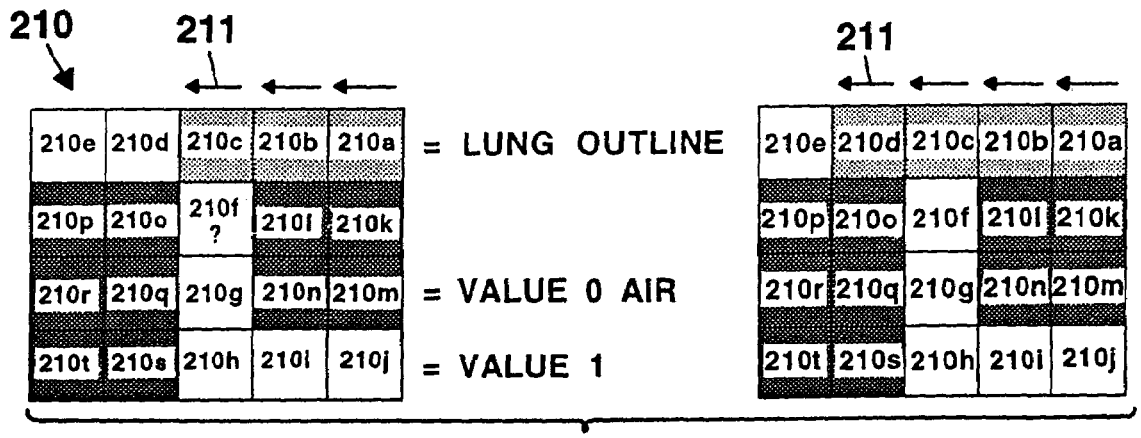
Figure 10C:
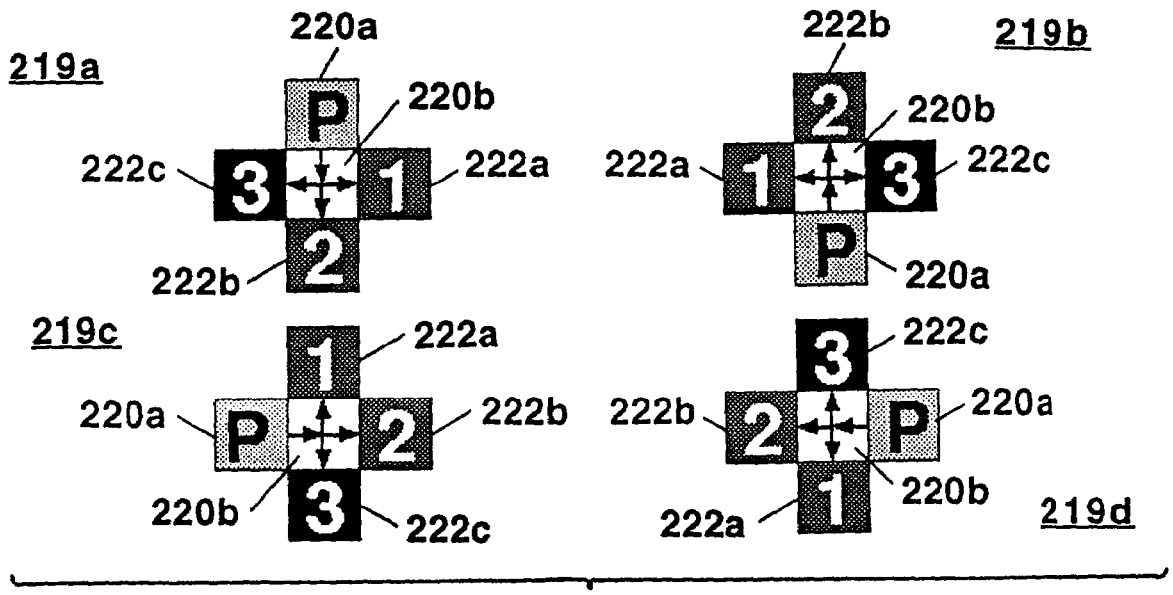
Figure 11A:
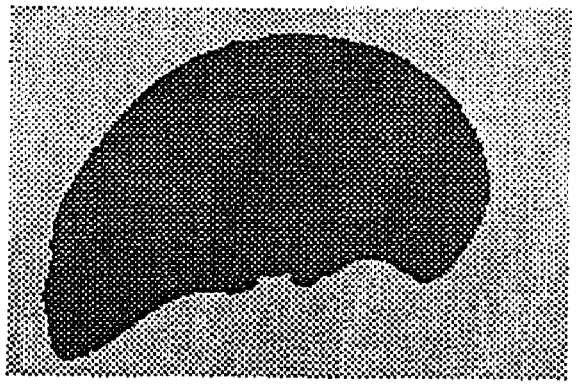
FIGS. 11A–11C are a series of diagrams which illustrate a lung border correction technique.
Figure 11B:
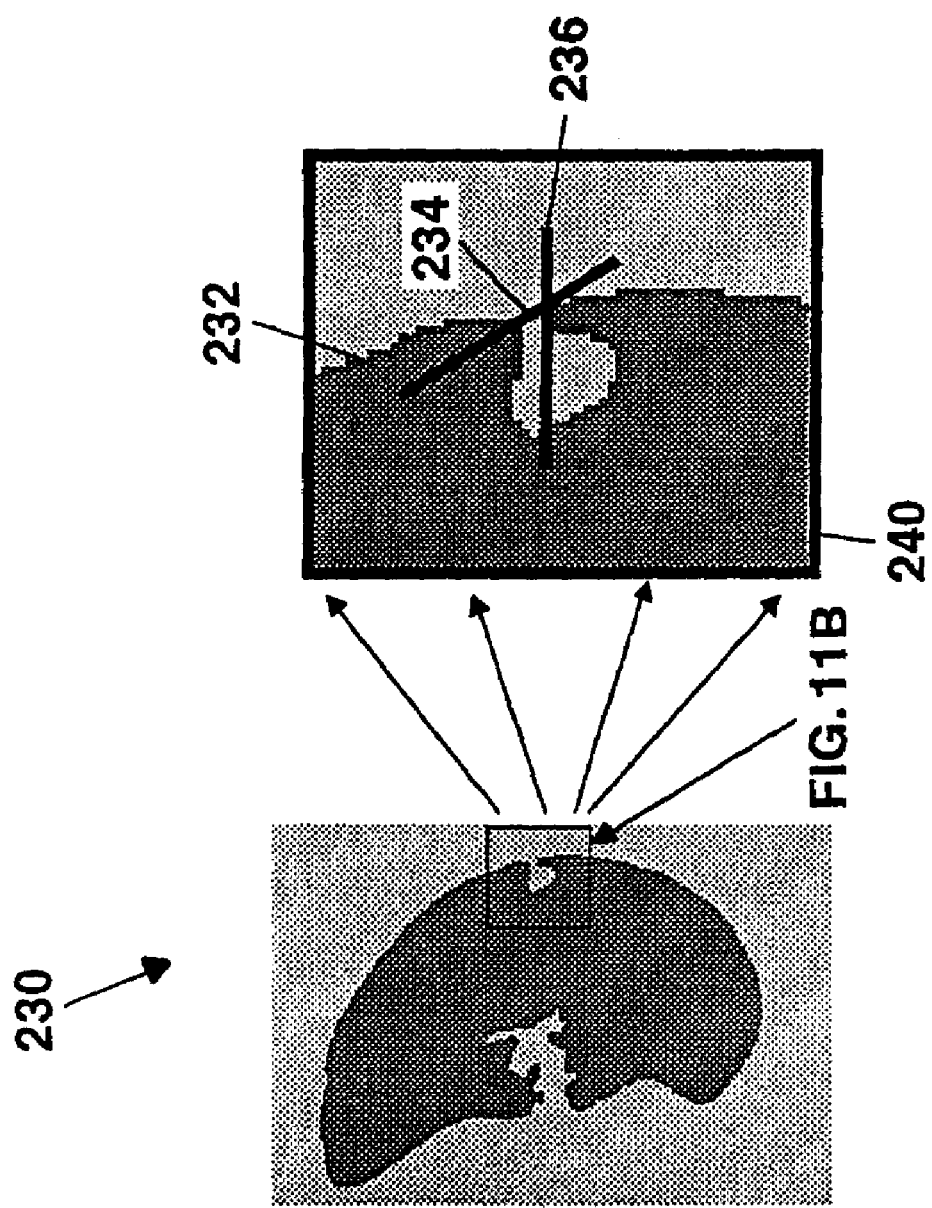
Figure 11C:
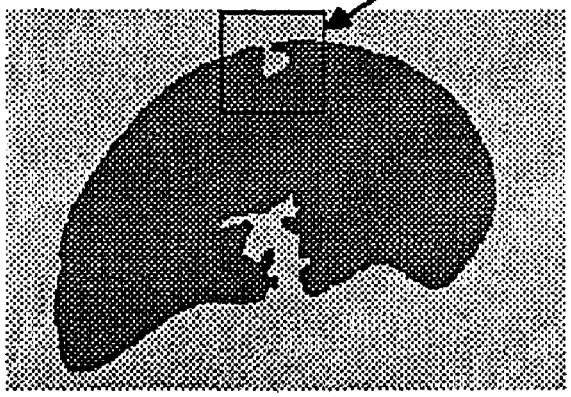
Figure 12A:
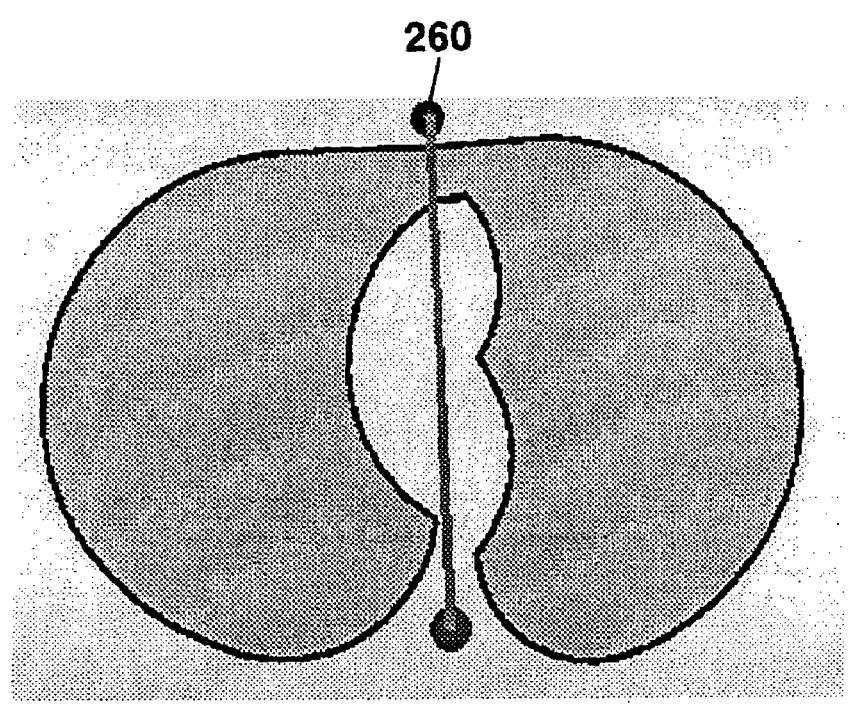
FIGS. 12A and 12B are a series of diagrams which illustrate a technique for identifying two lungs in an image.
Figure 12B:
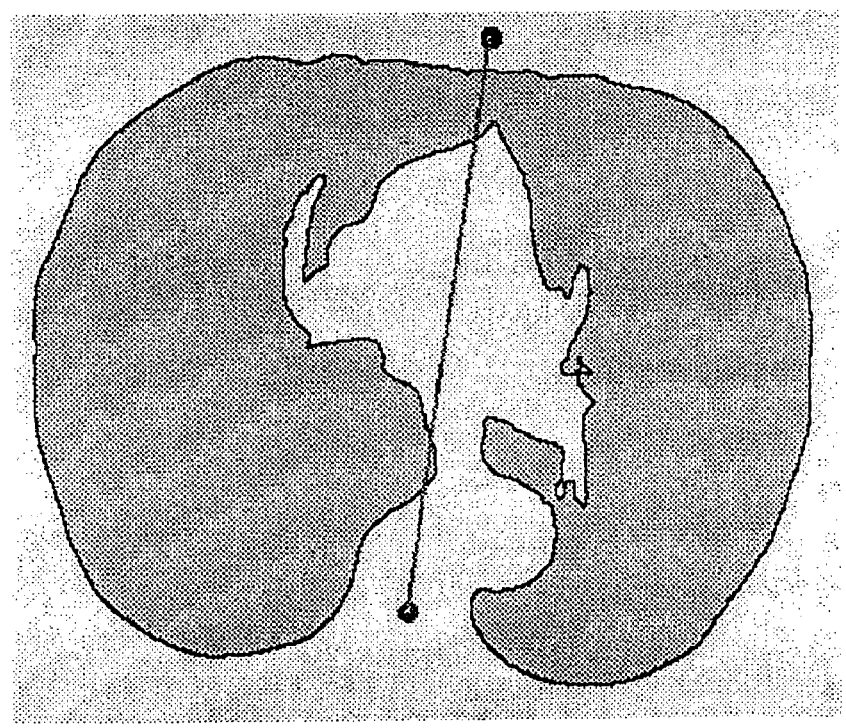

FIGS. 10A through 10C, together with FIGS. 11 and 12 illustrate the method for lung border detection. Once a lung starting point is found as described above in conjunction with FIG. 6, a lung border 204 is traced using the BID thresholded image data. The border 204 corresponds to a boundary for the pleural interface, which is the outer margin of the lung where it contacts the extra-pulmonary soft tissues. Both left and right lung borders are traced in counter-clockwise order. Those of ordinary skill in the art should appreciate that the lung borders could be traced in a clockwise direction and that whatever trace direction is used, the remaining processing must be consistent with that tracing direction. The tracing method marks thorax pixels at the border, which are pixels of value 1 that are next to pixels of value 0.

The tracing technique generates a linked list data structure of these marked lung border pixels. The border tracing proceeds inwards, around body structures. If that is not possible, the tracing proceeds straight, and if that is also hindered by a structure, the tracing proceeds outward. This process is described below.

Referring now to FIG. 10C, four-different pixel decision windows or masks 219a–219d generally denoted 219 are used to trace the lung border 204 (FIG. 10A). The first step for the direction of the tracing process utilizes one of the masks 219. Pixel 220b in the center of each mask 219 corresponds to the current lung border pixel. Pixel 220a corresponds to the prior lung border pixel.

The four-pixel decision masks 219 are utilized to trace the lung border within the BID lung image in the following manner. From pixel 220b, one of three possible pixels, 222a, 222b, or 222c, is selected next in the tracing process. It should be noted that each of the pixels 222a, 222b, 222c have different relative positions in the masks 219a–219d. The known relative positions of current pixel 220b and previous border pixel 220a determine which of the four-pixel masks 219 is used to determine the next lung border point. Depending upon the relative position of current and previous border pixels, the appropriate one of the masks 219 is selected from among the four masks 219a–219d shown in FIG. 10C. Having selected a mask, the order of selection for the next pixel is pixel 222a, pixel 222b, followed by pixel 222c. Each of these three pixels is tested in order by the second step below. Pixel 222a is examined first. If pixel 222a is not selected by the second step below, pixel 222b is examined next. If pixel 222b is also not selected, then pixel 222c is selected.

It should be noted that at the start of this process, not only a lung starting point is needed, but also a lung ending point, the point just prior the starting point. Ideally, an ending pixel immediately to the right of the starting pixel would define the ending pixel. However, this may not be a valid pixel. If the pixel to the right of the starting pixel is a dark lung pixel, this pixel is assigned to be the ending pixel. If the pixel to the right of the starting pixel is light tissue, then the pixel below the starting pixel is assigned to be the end pixel. In the above discussion about the four mask selection, the end pixel serves as the prior pixel, prior to the starting pixel.

Referring now to FIG. 10B, the second step for the direction of the tracing process is shown. Any pixel selected by step one above is included or excluded from the lung boundary by process to be described in conjunction with FIG. 10B. In this manner, the lung border detection method avoids including a value 1 pixel in the lung outline if it is the entrance to a narrow structure and is sandwiched between two value 0 pixels that image air. It is desirable to include such channels within the lung parenchyma rather than trace the lung boundary down the small border feature.

In FIG. 10B, previously selected value 1 lung border pixels 210a–210c are shown as cross-hatched. Other value 1 pixels 210d–210j that image vessels or artifacts have no fill, and value 0 pixels 210k–210t that image air are shown having vertical stripes. The tracing direction is shown using arrows indicated with reference label 211.

Where pixel 210c has been reached by the tracing process and is considered to be the "current lung border pixel," the lung tracing process may next consider pixel 210f, marked with a question mark in 210. Although pixel 210f is a possible selection as it is a value 1 pixel next to a value 0, pixel 210f is not chosen as the next pixel because it is sandwiched between two value 0 pixels, 210o and 210l. A value of 0 represents air, thus pixel 210f is most likely associated with a vessel or artifact surrounded by air. Instead, as shown in 212, another pixel, 210d, is chosen as the next pixel.

Referring now to FIG. 11, a third step in the lung border detection process is shown. This process is used to provide lung border correction. Using only the methods of steps 1 and 2 above, nodules that contact the lung border may be excluded from and placed outside the lung parenchyma. To avoid this, after the lung border is traced by steps 1 and 2 above, the computed curve along the lung border is corrected using a third step. The system performs the border correction by comparing the curvatures at points along the lung border. A rapid change in curvature indicates a nodule, large vessel, or bronchus, and these structures are subsequently included within the lung.

Referring now to FIG. 12, a forth step in the lung border detection process is shown. FIG. 12 illustrates how the system can differentiate cases where the two lungs contact each other resulting in a thin interface, termed the anterior junction line. Secondary to its thin width, the anterior junction line may not appear in the binary image due to its low gray value. If this occurs, the border detection algorithm traces along the right lung and then may follow the border into the left lung, with no separation between the lungs. As a result, both lungs are mistakenly traced as one lung. The system automatically detects this problem if by measuring the size of the right lung. If the right lung is larger than a reasonably expected lung size for the applicable CT slice then the system will apply a lung splitting process which splits the single trace into left and right lungs. In the lung splitting process, the centroids of the sternum and spine are computed using the PPID sub-regions data previously obtained using a conventional centroid computation. The lung pixels that are crossed by line 280 are assigned to be part of the border that separates the two lungs. In the region of the anterior junction interface, lung border pixels on the left of the calculated line then delineate the right lung and border pixels on the right of the line delineate the left lung.

Figure 13:
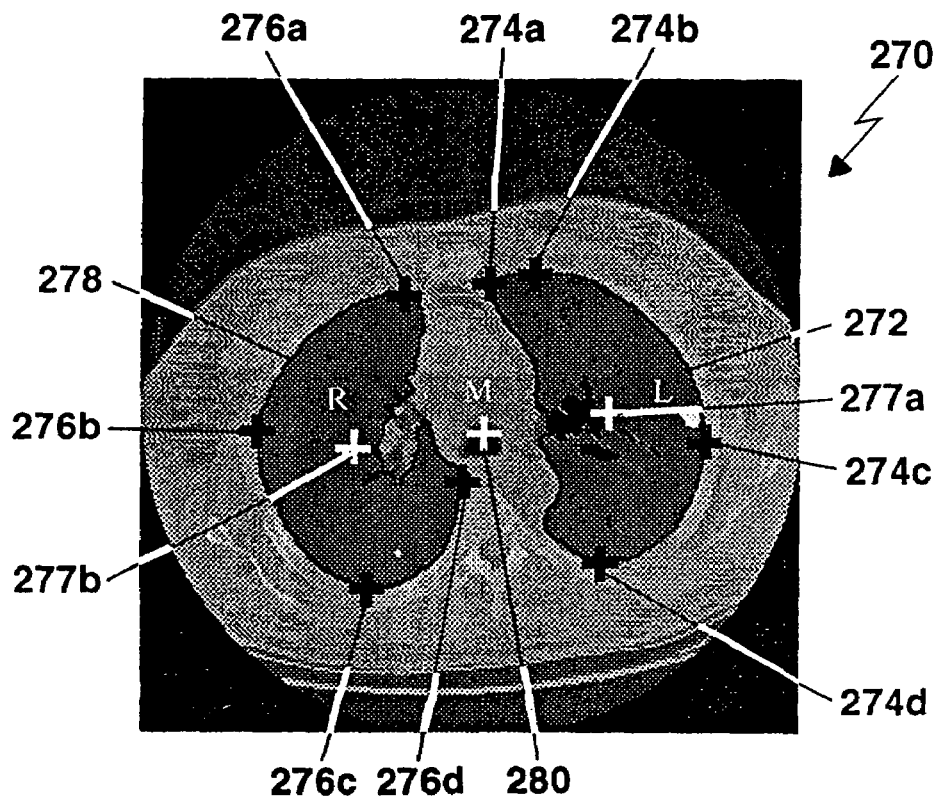
FIG. 13 is a CT image having lung centroids and most anterior, posterior, lateral, and medial pixels identified by the automated method of comparing different CT studies.

Referring now to FIG. 13, an image 270 which illustrates the final lung borders 272, 278 traced by the steps above is shown. The borders 272, 278, traced using the BID data, are shown imposed upon the full CT image 270. Centroids and other significant lung bounder points are shown in the figure. The centroid of an area can be defined as the central balance point for the area. The centroids 277b, 277a for the individual right and left lungs 278, 272 are calculated using the pixels within the parenchyma of the right and left lungs respectively. The image pixels of both lungs are used to calculate the main centroid 280 (also shown as a white cross, marked M in FIG. 13). The respective right and left lung centroids 277b, 277a are also shown as white crosses labeled with R and L in FIG. 13. Black crosses 2754a–274d and 276a–276d indicate the most anterior (276a and 274b), posterior (276c and 274d), lateral (276b and 274c), and medial (276d and 274a) pixels of each lung.

Figure 14:
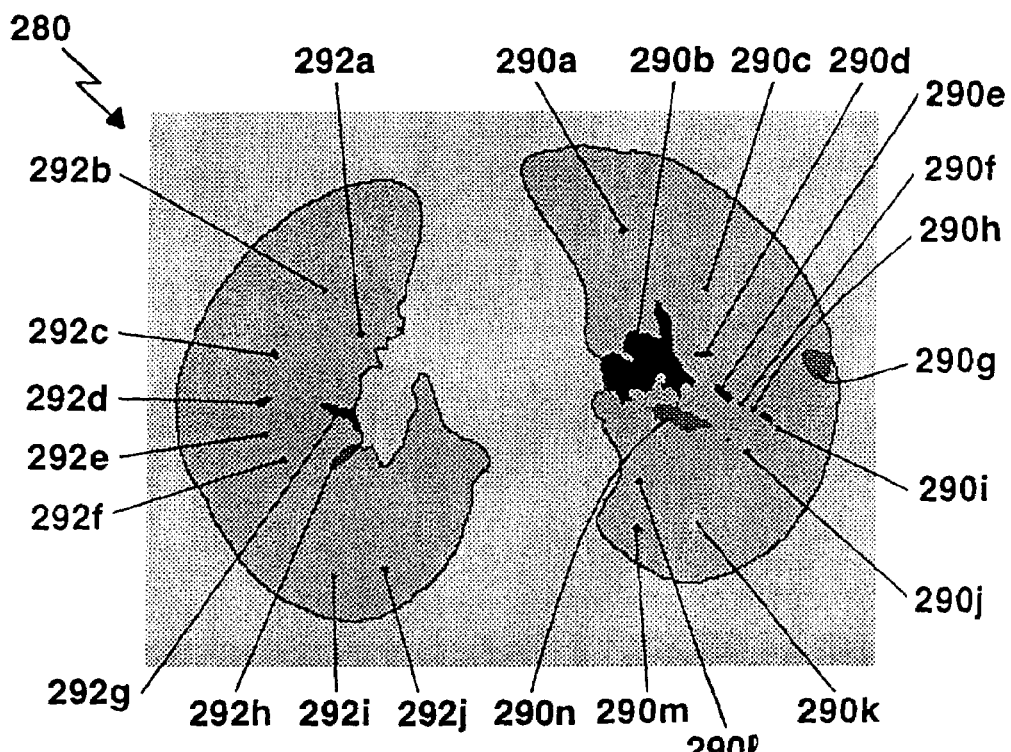
FIG. 14 is a diagram of a lung having lung structures identified.

FIG. 14 illustrates how the sequential labeling algorithm (Horn, MIT Press: 1986) is used to distinguish and label candidate regions uniquely. This technique finds connected regions within a BID binary image and labels them so that the regions are distinguished from each other. Each candidate region represents either a nodule or a normal structure and is assigned a label. Here, reference numbers are used as labels. Candidate regions are then analyzed in terms of location and shape to differentiate between the normal structures (vessels, bronchi) and nodules. For each candidate region, the number of pixels within this region is computed as a first estimate of the two-dimensional (2D) axial area. This estimate is then used to compute the centroid of the candidate region. The distance of this regional centroid to the ipsilateral lung centroid and the medial and lateral lung borders on the horizontal is computed.

There are two methods for computing the shape of a structure. Circular regions may be spherical nodules; however, circular regions on 2D CT images may also be vessels in cross section. Elongated regions indicate vessels. Shape determination is performed by two methods. In the first method, for each candidate region, the line of pixels for which the sum E of the square of the distance to points in the region is a minimum ($E_{min}$) is found as shown below. In these equations, x and y represent the rectangular coordinates of image pixels of an identified feature.

$$Shape = \frac{E_{min}}{E_{max}}$$

$$E_{min} = \frac{1}{2}(a+c) - \frac{1}{2}(a-c)\cos 2\alpha - \frac{1}{2}b\sin 2\alpha$$

$$E_{max} = \frac{1}{2}(a+c) + \frac{1}{2}(a-c)\cos 2\alpha + \frac{1}{2}b\sin 2\alpha$$

-continued $$a = \sum_{(x,y) \in S} x^2$$

$$b = \sum_{(x,y) \in S} xy^2$$

$$c = \sum_{(x,y) \in S} y^2$$

$$\sin 2\alpha = \frac{b}{\sqrt{(a-c)^2 + b^2}}$$

$$\cos 2\alpha = \frac{a-c}{\sqrt{(a-c)^2 + b^2}}$$

This line is the axis of least second moment or the "major axis" of the region. Maximizing the square of the distance to points in the region yields the "minor axis" of the region ($E_{max}$). The ratio $E_{min}/E_{max}$ is 0 for a straight-line region and 1 for a circular region, and therefore the ratio is an indicator of how elongated or circular the region is.

The second measure of shape, the circular occupancy factor is computed as shown below:

$$\text{Occupancy} = \frac{|s|}{|c|} = \frac{|\{(x,y) \varepsilon \text{lung}: (x,y) \varepsilon S\}|}{|\{(x,y) \varepsilon \text{lung}: (x-x_s)^2 + (y-y_s)^2 \le r_s^2\}|}$$

Number of pixels in structure S: |S|
Center of structure S: ($x_s$, $y_s$)
Radius of structure S: $r_s$
Number of pixels in surrounding circle: |C|

Figure 15:
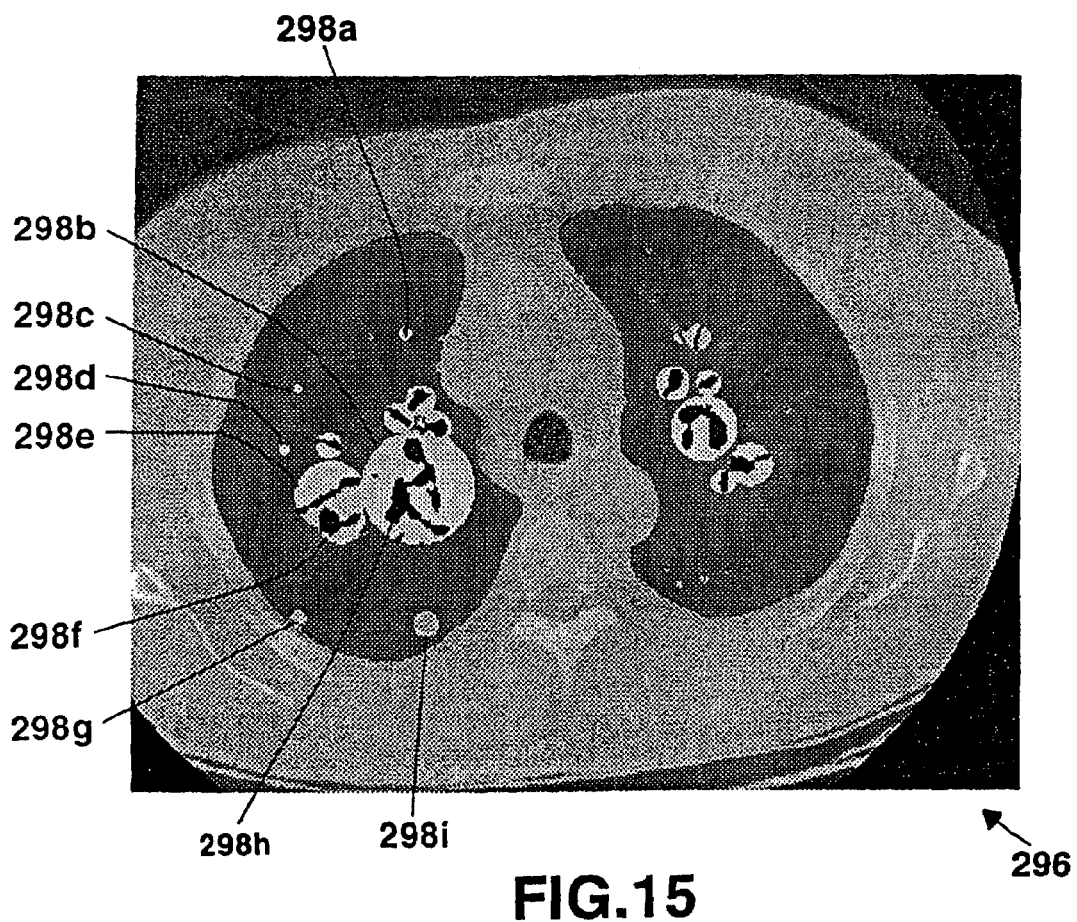
FIG. 15 is a CT image having nodules identified thereon.

The second method is illustrated on a CT image in FIG. 15 It is based upon the number of pixels within a circle surrounding the candidate region. A rounder candidate region occupies a larger percentage of pixels within this circle than elongated candidate regions.

Figure 17:
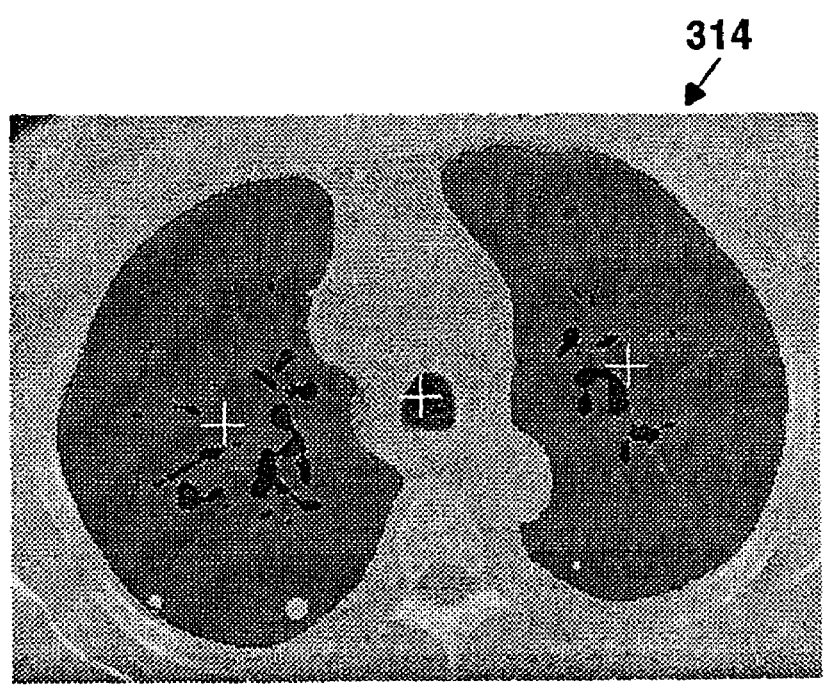
FIG. 17 is a CT image having candidate regions that have been classified into nodule or normal structure displayed thereon.

FIGS. 16 and 17 show how each lung is automatically segmented into 5 horizontal regions. FIG. 16 is an illustration of the lung regions of the CT image in FIG. 17. Region 1 contains the pixels furthest from the lung center, which is defined by the lung centroid. These pixels are located close to the lung border. Since vessels are typically not seen on CT within 5 mm of the pleura, large structures close to the border of the lung are determined to be "likely nodules:" Region 2 contains the pixels that are closer to the lung centroid and so forth. Region 4 contains the pixels that are closed to the centroid except for pixels in region 5, which is the area between lung centroid and global centroid. This region is delineated vertically to the top by one fourth of the distance to the most anterior pixel of the lung and to the bottom by one fourth of the distance to the most posterior pixel of the lung. The distance of a pixel to the lung centroid is computed along the line through the pixel and the lung centroid. This line extends from the pixel outward towards the lung border. The pixels along this line are grouped into the regions by their relative distance to the lung border.

Horizontal regions are computed differently depending upon the vertical region the analyzed imaged is located within. At the lung base in vertical region E described in FIG. 5, most pixels are placed into horizontal region 1 and are considered border pixels.

Figure 18:
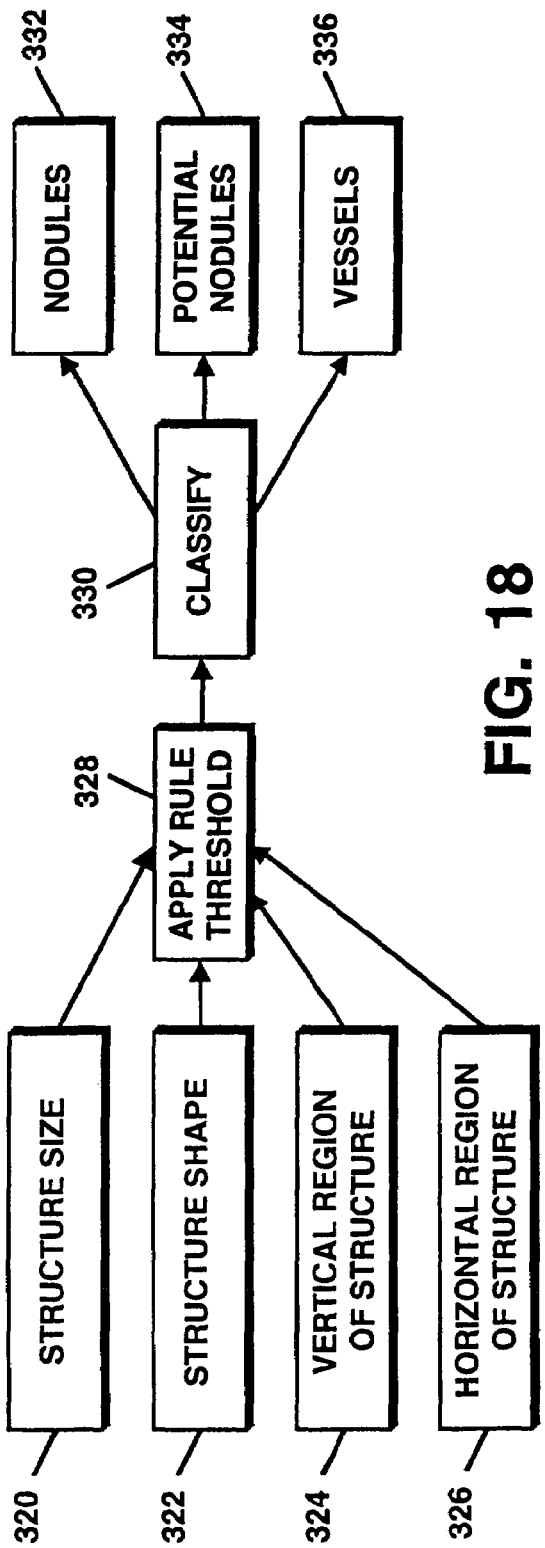
FIG. 18 is a flow diagram that illustrates the process of nodule classification.

FIG. 18 illustrates the process of nodule classification. Processing begins with steps 320–326 in which information corresponding to structure size 320, shape 322, vertical position 324, and horizontal region 326 are provided to step 328. In step 328, the information provided from steps 320–326 are used to determine thresholds for decision rules. The decision rules generated in step 328 are then used to classify a structure as shown in step 330. The structures may be classified as a nodule, a potential nodule, or a vessel. The volume of a nodule is calculated by automatically identifying the image in which the nodule is brightest. The nodule diameter (d) is measured in pixels and then translated into millimeters by dividing the width of the field of view by the width of the matrix (512). Assuming that a nodule has a spherical shape, its volume is $4/3\pi(d/2)^3$ and expressed in $mm^3$. At step 330, anatomical features are classified as nodules 332, potential nodules 334, or vessels 336.

Figure 19A:
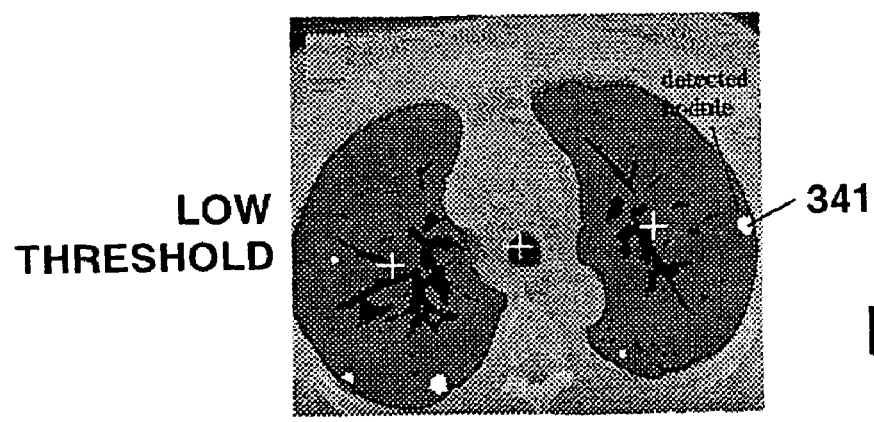

FIGS. 19 and 19A correspond to a pair of images illustrating resulting differences when how high (FIG. 19) and low (FIG. 19A) gray-level thresholds are used to process images and identify candidate regions. Centroids (crosses) of the left and right lungs and the main lung are shown. Detected vessels (labeled) are shown in black while nodules (labeled) are colored white. In FIG. 19, the nodule 341a in the left upper lobe periphery was not detected at a higher threshold, but was detected using a lower threshold as indicated by reference number 341b in FIG. 19A.

FIG. 20 demonstrates the registration process that aligns the images in different CT studies and its nodules. Identifying corresponding nodules on separate studies is more challenging than identifying corresponding nodules on consecutive images within the same study since differences in patient position and inspiration complicate the registration between two different CT examinations. In a first registration step 360, to be able to match an image on an initial CT examination with the most similar CT image on the subsequent study, the vertical region that the images belong to is identified and the images are aligned in the craniocaudal dimension. Thus, CT scans of the two studies are vertically matched and aligned. Processing for vertical alignment between studies proceeds as follows. First match the boundaries for each of the regions 98a–98e described above in conjunction with FIG. 5 between two scans. This tells which CT scans belong to each of the five regions 98a–98e. If there are an equal number of images for a particular region 98a–98e in each study, then use a one-to-one mapping between the images. If there are not an equal number of images, then the images must be matched using an interpolation technique to determine corresponding images between two different scans.

At a second registration step 362, other anatomical features are aligned. The other anatomical features used for registration include the sternum, the vertebra (spine) and the trachea. In particular, at step 362, the differences in thorax rotation between studies are addressed by aligning the centroids of the sternum and vertebra. These are anatomical landmarks with reproducible locations. Also at step 362, the centroid of the trachea is used because the trachea is generally located in the midline. However, the trachea can be shifted mediolaterally due to atelectasis or an adjacent mass and may not be a consistent landmark for registration. Trachea, spine, and sternum, and centroids of the individual and combined lungs in each study are aligned by affine transformation.

The equations below show the affine transformation for registration of CT images between two studies.

$$A = \begin{pmatrix} s_x & 0 \\ 0 & s_y \end{pmatrix} \begin{pmatrix} \cos\theta_0 & \sin\theta_0 \\ -\sin(\theta_0 + \alpha) & \cos(\theta_0 + \alpha) \end{pmatrix}$$

Position $x_0 = (x_0, y_0)$
Rotation $\theta_0$
Contractions $S_x, S_y$
Skew $\alpha$ One of ordinary skill in the art would recognize that the affine transformation could also be used to register adjacent CT scans within one CT study.

Also at step 362, the most medial, lateral, anterior, and posterior pixels of the right and left lungs are also identified and registered in addition to centroids of anatomical structures. Global registration of these centroids identifies translational and rotational differences between an image of a CT study and a corresponding image in another study of the same patient.

At step 364, the location of nodules from the initial study are registered with corresponding areas of the subsequent study. Given the centroid of a nodule on a CT image in the initial study, the projected centroid of its corresponding nodule in the subsequent study is calculated by using the translational and rotational parameters generated from global registration of thoracic structures. On the subsequent scan, a fixed area of 102 pixels around this projected centroid is searched to locate the centroid of the corresponding nodule.

Also at step 364, nodules identified in the initial study are compared against those in the same registered area of the subsequent study. Geometric characteristics are computed for the nodule as registered in the subsequent study. Changes in nodule characteristics between the two studies, most notably the nodule volume, are of diagnostic interest.

FIG. 21 illustrates automated registration techniques. The computer aligns consecutive images (images n and n+1) and detects nodules (arrows) within the same study. Images and nodules in study 1 are then matched with those in study 2. The thorax is rotated to the right in study 1 and mildly rotated to the left in study 2. Various centroids are used to detect and adjust for differences in torso rotation and translation. Centroids of the sternum (black cross marked with S), thoracic vertebra (black cross marked with V), trachea (white cross marked with T), both lungs (white cross marked with M), right lung (white cross marked with R), and left lung (white cross marked with L) lung are shown. Registration also uses the most medial, lateral, anterior, and posterior pixels of each lung image, which are marked by black crosses. Detected vessels are again colored black.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of processing computed tomographic (CT) images of a lung, the method comprising:
   generating a first plurality of CT images of the lung at a first time;
   generating a second plurality of CT images of the lung at another time;
   selecting a first CT image from among the first plurality of CT images; and
   relating the selected first CT image with the second plurality of images of the lung, wherein the relating comprises:
      selecting a plurality of predetermined vertical regions of the lung;
      identifying a first one of the predetermined vertical regions associated with the selected first CT image; and
      selecting a second CT image from among the second plurality of CT images associated with the identified first one of the predetermined vertical regions, and
      identifying a first one or more centroids in the selected first CT image and a second one or more centroids in the selected second CT image, wherein the first one or more centroids and the second one or more centroids are associated with at least one of a right lung or a left lung.

2. The method of claim 1, wherein the identifying a first one of the predetermined vertical regions comprises:
   identifying, in the selected first CT image, at least one of a first CT image spine region, a first CT image sternum region, or a first CT image trachea region; and
   comparing at least one of the first CT image spine region, the first CT image sternum region, or the first CT image trachea region with a respective at least one of a template of a spine region, a template of a sternum region, or a template of a trachea region, wherein the template of the spine region, the template of the sternum region, and the template of the trachea region are associated with the first one of the predetermined vertical regions of the lung.

3. The method of claim 1, wherein the relating the selected first CT image with the second plurality of images her comprises:
   aligning the first one or more centroids with the second one or more centrioids.

4. A method of processing computed tomographic (CT) images of a lung, the method comprising:
   identifying a structure in a first CT image of the lung;
   computing a first shape associated with the structure in the first CT image, wherein the first shape is computed as at least one of a first occupancy factor and a first ratio between a major axis of the structure and a minor axis of the structure, wherein the first occupancy factor is indicative of a portion of a predetermined shape occupied by the structure; and
   classifying the structure.

5. The method of claim 4, wherein the classifying the structure includes classifying the structure as a selected one of a nodule, a potential nodule, or a vessel in accordance with the first shape.

6. The method of claim 4, wherein the first occupancy factor is a circular occupancy factor indicative of a portion of a first circle occupied by the structure.

7. The method of claim 4, further including:
   computing a first volume of the structure in the first CT image; and
   classifying the structure in accordance with at least one of the first shape or the first volume of the structure.

8. The method of claim 7, further including:
   segmenting the first CT image of the lung into two or more predetermined horizontal regions; and
   identifying a first horizontal region in which the structure resides from among the two or more predetermined horizontal regions in the first CT image, wherein the classifying the structure is made in accordance with at least one of the first shape, the first volume of the structure, or the identified first horizontal region.

9. The method of claim 4, further including:
segmenting the first CT image of the lung into two or more predetermined horizontal regions; and
identifying a first horizontal region in which the structure resides from among the two or more predetermined horizontal regions, wherein the classifying the structure is made in accordance with at least one of the first shape or the identified first horizontal region.

10. The method of claim 4, further including:
identifying the structure in a second CT image of the lung; and
computing a second shape associated with the structure in the second CT image, wherein the second shape is computed as at least one of a second occupancy factor and a second ratio between a major axis of the structure and a minor axis of the structure, wherein the second occupancy factor is indicative of a portion of a predetermined shape occupied by the structure.

11. The method of claim 10, wherein the classifying the structure includes classifying the structure as a selected one of a nodule, a potential nodule, or a vessel in accordance with at least one of the first shape or the second shape.

12. The method of claim 10, wherein the second occupancy factor is a circular occupancy factor indicative of a portion of a second circle occupied by the structure.

13. The method of claim 10, further including:
computing a second volume of the structure in the second CT image; and
classifying the structure in accordance with at least one of the first shape, the second shape, the first volume, or the second volume.

14. The method of claim 13, further including:
segmenting the second CT image of the lung into two or more predetermined horizontal regions; and
identifying a second horizontal region in which the structure resides from among the two or more predetermined horizontal regions in the second CT image, wherein the classifying the structure is made in accordance with at least one of the first shape, the second shape, the first volume, the second volume, the first horizontal region, or the second horizontal region.

15. The method of claim 10, further including:
segmenting the second CT image of the lung into two or more predetermined horizontal regions; and
identifying a second horizontal region in which the structure resides from among the two or more predetermined horizontal region; wherein the classifying the structure is made in accordance with at least one of the first shape, the second shape, the first horizontal region, or the second horizontal region.

16. A method of processing computed tomographic (CT) images of a lung, the method comprising:
identifying a lung boundary in the CT image, wherein the identifying comprises:
applying pixel rules associated with the CT image to provide a preliminary lung boundary, wherein the pixel rules comprise:
identifying a starting pixel in the CT image associated with the lung boundary; and
identifying a next pixel associated with the preliminary lung boundary in accordance with pixel densities of pixels surrounding the starting pixel; and
applying boundary rules to the preliminary lung boundary to provide a final lung boundary.

17. The method of claim 16, wherein the boundary rules comprise:
computing a volume of a lung associated with the preliminary lung boundary; and
splitting the preliminary lung boundary if the volume of the lung is greater than a predetermined lung volume value.

18. The method of claim 17, wherein the boundary rules further comprise:
identifying a curvature associated with the preliminary lung boundary; and
altering the preliminary lung boundary if the curvature of the preliminary lung boundary is greater than a predetermined curvature value.

19. The method of claim 2, wherein the identifying, in the first CT image, the at least one of the first CT image spine region, the first CT image sternum region, or the first CT image trachea region, comprises:
generating at least one histogram of pixel intensities associated with the first CT image projected along a respective at least one axis on the first CT image.

20. The method of claim 2, wherein the selecting the second CT image from among the second plurality of CT images comprises:
identifying, in the selected second CT image, at least one of a second CT image spine region, a second CT image sternum region, or a second CT image trachea region; and
comparing at least one of the second CT image spine region, the second CT image sternum region, or the second CT image trachea region with a respective at least one of the template of the spine region, the template of the sternum region, or the template of the trachea region, wherein the template of the spine region, the template of the sternum region, and the template of the trachea region are associated with the first one of the predetermined vertical regions of the lung.

21. The method of claim 20, wherein the identifying, in the second CT image, the at least one of the second CT image spine region, the second CT image sternum region, or the second CT image trachea region, comprises:
generating at least one histogram of pixel intensities associated with the second CT image projected along a respective at least one axis on the second CT image.

* * * * *

UNITED STATES PATENT AND TRADEMARK OFFICE
CERTIFICATE OF CORRECTION

PATENT NO. : 7,206,462 B1
APPLICATION NO. : 10/900031
DATED : April 17, 2007
INVENTOR(S) : Betke et al.

It is certified that error appears in the above-identified patent and that said Letters Patent is hereby corrected as shown below:

Column 2, line 45 delete "patient lung." And replace with --patient's lung.--.

Column 3, line 19 delete "is provide" and replace with --is to provide--.

Column 3, line 22 delete "object is provide" and replace with --object of this invention is to provide--.

Column 3, line 31 delete "is provide" and replace with --is to provide--.

Column 4, line 19 delete "transformation for example." and replace with --transformation, for example.--.

Column 4, line 66 delete "Moreover, since the" and replace with --Moreover, the--.

Column 5, line 6 delete "using from CT scans." and replace with --from CT scans.--.

Column 5, line 12 delete "suggest" and replace with --suggests--.

Column 5, line 14 delete "nodules is used" and replace with --nodules used--.

Column 5, line 48 delete "it made" and replace with --is made--.

Column 7, line 7 delete "performed such operations some" and replace with --perform such operations, some--.

Column 7, lines 16-17 delete "two dimensional" and replace with --two-dimensional--.

Column 7, line 35 delete "array" and replace with --arrays--.

Column 8, line 1 delete "Sometime" and replace with --Sometimes--.

Column 8, line 24 delete "further processed to" and replace with --further to--.

Column 9, line 5 delete "images" and replace with --image--.

Column 10, lines 33-34 delete "can if desired" and replace with --can, if desired,--.

Column 10, lines 55-56 delete "in describe" and replace with --is described--.

UNITED STATES PATENT AND TRADEMARK OFFICE
CERTIFICATE OF CORRECTION

| | |
|---|---|
| PATENT NO. | : 7,206,462 B1 |
| APPLICATION NO. | : 10/900031 |
| DATED | : April 17, 2007 |
| INVENTOR(S) | : Betke et al. |

It is certified that error appears in the above-identified patent and that said Letters Patent is hereby corrected as shown below:

Column 10, line 63 delete "manner structures" and replace with --manner, structures--.

Column 11, line 16 delete "images the" and replace with --images, the--.

Column 11, line 18 delete "as" and replace with --are--.

Column 12, line 19 delete "step 36 a" and replace with --step 36,--.

Column 12, line 27 delete "Next" and replace with --Next,--.

Column 12, line 39 delete "Step 38 a" and replace with --Step 38, a--.

Column 12, line 49 delete ", decision" and replace with --, a decision--.

Column 13, line 49 delete "Image" and replace with --image--.

Column 13, line 50 delete "are" and replace with --which are--.

Column 13, line 64 delete "Step 54 a" and replace with --Step 54, a--.

Column 14, lines 7-8 delete "size shape" and replace with --size, shape--.

Column 14, line 15 delete "that determines" and replace with --determine--.

Column 14, line 30 delete "Referring to now to" and replace with --Referring now to--.

Column 14, line 35 delete "region" and replace with --regions--.

Column 14, line 38 delete "threshold" and replace with --thresholded--.

Column 14, line 41 delete "Here a" and replace with --Here, a--.

Column 14, lines 42-43 delete "In practice a" and replace with --In practice, a--.

Column 15, lines 22-23 delete "improve the accuracy with which structure and" and replace with --improves the accuracy with which structure is--.

UNITED STATES PATENT AND TRADEMARK OFFICE
CERTIFICATE OF CORRECTION

| | |
|---|---|
| PATENT NO. | : 7,206,462 B1 |
| APPLICATION NO. | : 10/900031 |
| DATED | : April 17, 2007 |
| INVENTOR(S) | : Betke et al. |

It is certified that error appears in the above-identified patent and that said Letters Patent is hereby corrected as shown below:

Column 15, line 65 delete "Next processing" and replace with --Next, processing--.

Column 16, line 14 delete "If decision is made is step 80" and replace with --If a decision is made in step 80--.

Column 16, line 65 delete "process the" and replace with --process, the--.

Column 16, line 67 delete "Next the" and replace with --Next, the--.

Column 17, line 23 delete "to dome of diaphragm." and replace with --to the dome of the diaphragm.--.

Column 17, lines 25-26 delete "dome of diaphragm." and replace with --dome of the diaphragm.--.

Column 17, line 39 delete "down sampling" and replace with --downsampling--.

Column 17, line 65 delete "which".

Column 18, line 7 delete "note" and replace with --noted--.

Column 18, line 13 delete "FIG. 7A a" and replace with --FIG. 7A, a--.

Column 19, line 28 delete "FIG. 8A a" and replace with --FIG. 8A, a--.

Column 19, line 64 delete "FIG. 9A a" and replace with --FIG. 9A, a--.

Column 20, line 13 delete "FIG 9B a" and replace with --FIG. 9B, a--.

Column 22, line 3 delete "CT slice then" and replace with --CT slice, then--.

Column 22, line 19 delete "bounder" and replace with --border--.

Column 22, line 28 delete "2754a" and replace with --274a--.

Column 23, lines 35-36 delete "FIG. 15 It" and replace with --FIG. 15. It--.

Column 23, line 45 delete "on CT within" and replace with --on a CT image within--.

UNITED STATES PATENT AND TRADEMARK OFFICE
CERTIFICATE OF CORRECTION

PATENT NO. : 7,206,462 B1
APPLICATION NO. : 10/900031
DATED : April 17, 2007
INVENTOR(S) : Betke et al.

It is certified that error appears in the above-identified patent and that said Letters Patent is hereby corrected as shown below:

Column 25, line 28 delete "102" and replace with --$10^2$--.

Column 25, line 48 delete "lung are shown." and replace with --are shown.--.

Column 26, line 36 delete "her" and replace with --further--.

Column 26, line 38 delete "centrioids" and replace with --centroids--.

Column 27, line 50 delete "region;" and replace with --regions;--.

Signed and Sealed this

Eleventh Day of March, 2008

JON W. DUDAS
*Director of the United States Patent and Trademark Office*